(12) United States Patent
Bader et al.

(10) Patent No.: US 7,523,362 B2
(45) Date of Patent: Apr. 21, 2009

(54) SYSTEM AND METHOD FOR TRANSMITTING AUDIO OR VIDEO DATA USING MULTIPLE LEVELS OF PROTECTION

(75) Inventors: Carl V. Bader, Downingtown, PA (US); Robert P. Clemens, West Chester, PA (US); Thomas D. Metcalf, Philadelphia, PA (US)

(73) Assignee: Aviom, Inc., West Chester, PA (US)

( * ) Notice: Subject to any disclaimer, the term of this patent is extended or adjusted under 35 U.S.C. 154(b) by 537 days.

(21) Appl. No.: 11/379,843

(22) Filed: Apr. 24, 2006

(65) Prior Publication Data

US 2006/0282748 A1 Dec. 14, 2006

Related U.S. Application Data

(63) Continuation of application No. 10/341,878, filed on Jan. 14, 2003, now Pat. No. 7,043,671.

(60) Provisional application No. 60/349,114, filed on Jan. 16, 2002.

(51) Int. Cl.
*G06F 11/00* (2006.01)
*H04J 3/00* (2006.01)

(52) U.S. Cl. .................. 714/701; 370/476
(58) Field of Classification Search .............. 714/701, 714/712; 370/476
See application file for complete search history.

(56) References Cited

U.S. PATENT DOCUMENTS

| | | | |
|---|---|---|---|
| 4,646,289 A | 2/1987 | Tsiakas et al. | |
| 5,148,272 A | 9/1992 | Acampora | |
| 5,376,969 A | 12/1994 | Zdepski | |
| 5,862,171 A | 1/1999 | Mahany | |
| 6,275,507 B1 | 8/2001 | Anderson et al. | |
| 6,289,485 B1 | 9/2001 | Shiomoto | |
| 6,301,366 B1 * | 10/2001 | Malcolm et al. | 381/119 |
| 6,317,462 B1 | 11/2001 | Boyce | |
| 6,490,705 B1 | 12/2002 | Boyce | |
| 6,614,796 B1 | 9/2003 | Black et al. | |
| 6,671,416 B2 | 12/2003 | Vishwanath | |
| 7,043,671 B2 | 5/2006 | Bader et al. | |
| 2002/0053049 A1 | 5/2002 | Shiomoto et al. | |

FOREIGN PATENT DOCUMENTS

WO    WO 03/063465 A3    7/2003

\* cited by examiner

*Primary Examiner*—Cynthia Britt
(74) *Attorney, Agent, or Firm*—Pepper Hamilton LLP

(57) ABSTRACT

A data transmission and distribution system includes a series of payloads, where each of the payloads is formed from bits of audio or video information, and where different levels of protection are applied to different sets of bits in each payload. The system divides the bits associated with each payload into high priority bits and low priority bits and forms a group of check bits for each payload by applying an error correction algorithm to the high priority bits in the payload. The system also forms each payload from a first set of high priority bits, check bits and low priority bits and a redundant set of high priority bits and check bits and transmits the payloads formed from the first set of the high priority bits, the check bits, the low priority bits and the redundant set of high priority bits and check bits.

18 Claims, 14 Drawing Sheets

SYSTEM AND METHOD FOR TRANSMITTING AUDIO OR VIDEO DATA USING MULTIPLE LEVELS OF PROTECTION

CROSS REFERENCE TO RELATED APPLICATIONS

This application claims priority to U.S. patent application Ser. No. 10/341,878, entitled "System and Method for Transmitting Audio or Video Data Using Multiple Levels of Protection" filed Jan. 14, 2003, and claiming priority to Provisional Patent Application No. 60/349,114, entitled "Soniqnet, a Protocol for Transmitting Digital Audio and Video Data and Product Implementations Utilizing the Soniqnet Protocol," filed Jan. 16, 2002, each of which is incorporated herein by reference in its entirety.

BACKGROUND

1. Technical Field

The invention relates generally to digital audio and video data transmission, and in particular, to transmitting multiple channels of digital audio and video data over serial data links.

2. Background

In today's technologically demanding society, there is a growing need to transmit and receive electronic data more efficiently. To that end, several means of transmitting and receiving electronic data currently exist. A packet-switched network system or circuit-switched network system, for instance, provides some of the most common methods of transmitting and receiving electronic data. It should be noted, however, that transmission errors may exist in any kind of data transmission. A packet-switched network, for instance, can be affected by transmission errors such as loss of packets.

Transmission errors can severely hinder the efficiency of data transmission. Consider, for instance, a situation where a data packet is lost during data transmission. This is a relatively frequent problem encountered in packet switched networks. In such a case, the problem may be more complex than it may seem initially. When a data packet is lost during transmission, not only the data in the packet is affected, but also the data in other packets transmitted during the same transmission is affected. This is because data packets are generally transmitted in an organized sequence and that loss of one packet may affect the sequence of data transmission for the entire sequence of packets. As a result, a transmission error causing loss of one packet may further render all subsequent packets out of order and therefore useless.

To combat this kind of situation, several means of detecting, correcting or combination of both have been introduced. For instance, one of the most common methods of reducing transmission errors is to add certain control data bits, such as check sum bits or parity bits, in data packets during data transmission. It should be noted that, however, while this method of adding control data bits can help minimize transmission errors, it may not be desirable in all situations. For example, although a parity bit scheme could be used to detect certain transmission errors, it may not be able to detect errors in which an even number of bits in the same data unit are changed due to electrical noise.

Furthermore, these error detection and/or correction methods provide the same level of protection to the entire length of data, without assigning any particular importance to a particular section of data, which may represent a critical part of the data. As a result, data packets using some of the known transmission error detection and/or correction methods are unnecessarily bulky, thereby reducing the rate of transmission. Some network systems, therefore, use the type of communication medium that allows greater bandwidth, such as fiber optics, rather than using the traditional metal cables. However, one of the disadvantages of fiber optics is that they are very expensive to install and maintain. Furthermore, fiber optics are very fragile, and as such, are difficult to split. Thus, use of fiber optics, in many situations, can be uneconomical.

A packet-switched system may be used for transmitting and receiving audio or video data in real-time. In such a situation, any transmission error can cause significant impact on the audio or video receiver, and may result in a transmission delay. The delay can cause severe impact on the quality of the output audio or video data. This is significant since many devices today rely on real-time communication of data. An audio mixer, for example, is a device that typically relies on real-time communication of data. An audio mixer allows multiple audio sources (i.e., input data channels) to be individually controlled and added together (hence the name "mixer") to produce one or more audio outputs suitable for broadcast to many users. Audio mixers are used today in a variety of applications, providing many functions, including, among others, transmitting, receiving, recording, enhancing, and presenting audio data. Any data transmission problems, such as loss or delay of data packets, may result in the reduced functionality of the audio mixer.

Thus, there exists a need for a system and method of transmitting and receiving data efficiently, reliably, and economically. In particular, there exists a need for a system and method of transmitting and receiving digital audio and video data. There exists a further need for a system and method of enhancing the functionalities of devices that transmit and receive digital audio and video data. There exists yet a further need for a system and method of providing an error-tolerant system that allows transmission of real-time, high quality, multi-channel audio and video data as well as generic digital data over any serial data link.

SUMMARY

The present invention is directed to a data transmission and distribution system that includes a series of payloads, where each of the payloads is formed from bits of audio or video information, and where different levels of protection are applied to different sets of bits in each payload. The system divides the bits associated with each payload into high priority bits and low priority bits and forms a group of check bits for each payload by applying an error correction algorithm to the high priority bits in the payload. The system also forms each payload from a first set of the high priority bits, the check bits, the low priority bits and a redundant set of the high priority bits and the check bits and transmits the payloads formed from the first set of the high priority bits, the check bits, the low priority bits and the redundant set of the high priority bits and the check bits.

The present invention is also directed to a data transmission and distribution system that includes a transmitter and a receiver. The transmitter transmits a count value associated with a data clock of the transmitter to the receiver over an asynchronous link as part of an information payload that also includes audio or video information. The data clock is synchronously recreated at the receiver using only a system clock associated with the receiver and the transmitted count value.

The present invention is also directed to a data transmission and distribution system that includes a series of payloads. Each of the payloads is formed from samples of audio or video information. The system interleaves the audio or video samples in each payload where no two consecutive samples are lost upon a loss of an entire frame of the interleaved samples.

The present invention is also directed to a system for transmitting and distributing audio or video information. The system includes a plurality of input modules arranged in series along at least one chain of high speed serial data links that end with a master module. Each input module receives mixing instructions addressed to that module and then passes a signal mixed in accordance with the instructions to the next input module in the chain where no human perceptible delay is introduced into the mixed signal as it moves through the chain.

In one embodiment, the system includes a plurality of control surfaces for simultaneously controlling system parameters associated with each of the input modules and output busses. One or more of the control surfaces are physically separated in location from the input, output and master modules.

In one embodiment, the system includes a digitally remote controlled microphone preamp controlled from a control surface that is physically separated from the preamp, the input, output and master modules. The control data is sent from the control surface to adjust the microphone preamp's gain at an input module.

In one embodiment, the system includes a protocol that automatically enumerates each audio channel of at least one of the input modules in a manner that assigns the each audio channel of the at least one input module to a given channel regardless of the order in which the input modules are connected along the drain.

In one embodiment, the system includes a one or more output modules. Each input module in the chain has a defined delay that is used to maintain a final mix in a time aligned format.

The present invention is also directed to a system for transmitting and distributing audio or video information. The system includes a multi-channel input module and multiple receivers arranged along at least one chain of high speed serial data links where each receiver can tap into a common set of digital channels generated by a transmitter. Each receiver can create its own user adjustable mix based on one or more signals from the common set of digital channels.

In one embodiment, each receiver can output one or more signals from the common set of digital channels.

In one embodiment, each receiver employs s digitally controlled analog master audio gain control that automatically adjusts itself to keep an overall output volume constant when an individual channel's volume is raised to its maximum digital level. The system-automatically lowers the digital volume levels of all other channels and raises the master gain, thereby effectively raising the volume of the channel that is at its maximum digital level thus allowing greater dynamic range control of the digital mix.

DETAILED DESCRIPTION

Figure 1:
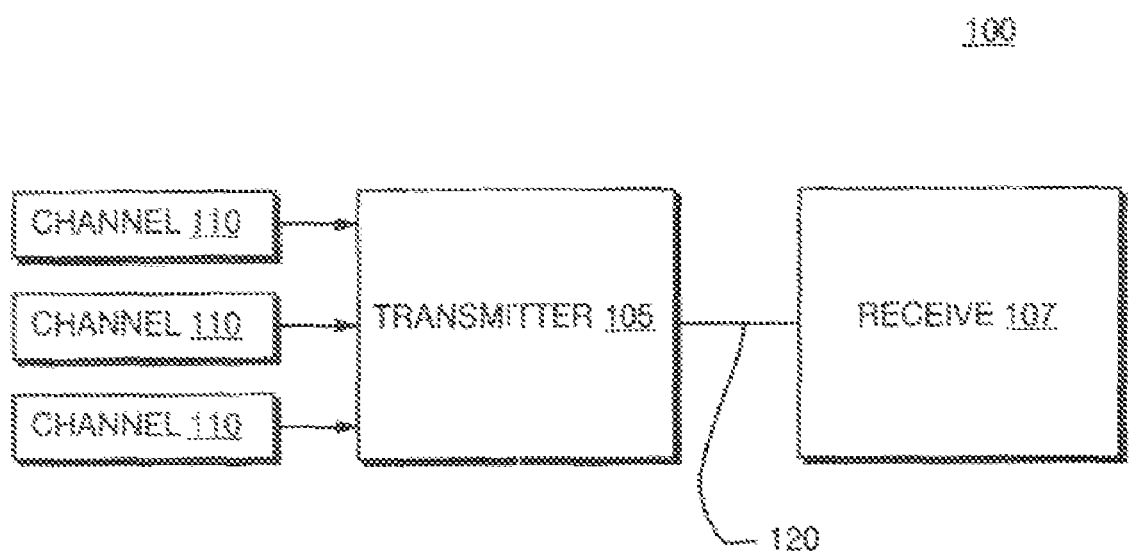
FIG. 1 is a block diagram showing one embodiment of a data transmission system, in accordance with the present invention.

For purposes of the present invention, each of the terms set forth below shall be defined in accordance with the corresponding definitions set forth below:

"Application-Specific Integrated Circuit" or "ASIC" shall mean a microchip designed for a special application, such as a particular kind of transmission protocol.

"Bit Clock" shall mean a clock signal that tracks the bits of audio data coming out of the A/D (analog to digital) or going into the D/A (digital to analog) converters.

"Center Section" shall mean a section of data that contains the lower bits of the audio sample data.

"Channel" shall mean a separate line of audio data, where each channel represents a stream of audio data.

"Critical data" shall mean the data that cannot be lost without having to interpolate missing data on the receiver.

"Cyclic Redundancy Check" or "CRC" shall mean a checksum that is calculated on a stream of data to provide a security check that the data arrived at the receiver without error. CRC-32 means that the checksum algorithm is calculated out to 32 bits.

"Error Correction Code" or "ECC" shall mean appended data that is being read or transmitted to allow for error checking and correcting on the fly. See FEC.

"Ethernet L/R Count" or "ELR Count" shall mean the number of Ethernet clocks per payload (defined by a fixed number of L/R clocks), as counted on the transmitter and sent to the receiver.

"Ethernet Clock" shall mean the clock signal that drives the data across the Ethernet.

"Forward Error Correction" or "FEC" shall mean a method where data can be encoded with extra "check" bits prior to transmission. At the receiver, the check bits provide a way of not only detecting bit errors, but correcting them as well, avoiding retransmission (which would not be acceptable for audio or video streaming applications). See ECC.

"Frame" shall mean a package of data that is recognized by the hardware interfacing with the outside world. Data sent using Ethernet drivers must be framed following the Ethernet protocol. The application-specific data contained within the frame is independent of the Ethernet standard.

"Idle" shall mean the time between frames that the line has no activity.

"Left/Right Clock" or "L/R Clock" shall mean the clock signal that tracks the start of each new sample.

"Medium Access Control" or "MAC" shall mean the layer of hardware that resides above the Physical Layer. At this layer, data packets are encoded and decoded.

"Master Clock" shall mean the clock signal that drives the A/D's and D/A's.

"Payload" shall mean a collection of frames that contains the encoded data that is sent over the CAT-5 wire.

"Phased Lock Loop" or "PLL" shall mean a section of hardware that can be used to smooth out irregularities in a clock signal, such as a "jitter filter," or it can be used as a frequency multiplier.

"Physical Layer" or "PHY Layer" or "PHY" shall mean the lowest hardware layer where the data meets the wire. This layer conveys the bit stream, including electrical impulse, light or radio signal, through the network at the electrical and mechanical level.

"Preamble" shall mean a series of eight (8) specific bytes, dictated by the Ethernet standard and recognized by the hardware, that indicate the start of a frame.

"Priority Section" shall mean a section of data that contains the higher bits of the audio or video sample data. The data in this section is critical and warrants the highest protection in the system.

"Redundant Section" shall mean a section of data that contains s copy of the Priority Section. It is provided as a backup of the data in the event that some or all of the data in the Priority Section is lost.

"Sample" shall mean an item of data that represents voltage level of an analog voltage waveform at a given point in time.

"Sample Rate" shall mean the number of samples of an analog signal that are taken per second to represent the event digitally.

System Overview

In accordance with the present invention, a novel system and method for facilitating data transmission and distribution, and in particular, transmission and distribution of audio data and/or video data, is provided. The system and method of the present invention can be implemented in a variety of system configurations, including without limitation, a multiplexer system that combines multiple signals, including analog or digital or combination thereof, received from multiple input sources for transmission over a single line or medium.

It should be noted that while mush of the description herein regarding the systems and methods of the present invention pertains to data transmission and distribution of audio data, the systems and methods, in accordance with the present invention, are equally applicable to transmission and distribution of video data and other generic data, including without limitation, control data.

One embodiment of the present invention relating to data transmission using data transmission system 100 is illustrated in FIG. 1. It should be noted that the configuration of data transmission system 100 represents one embodiment that is used to carry out the inventive concepts of the present invention, an, as such, there are multiple variations thereof within the scope and spirit of the present invention.

As shown, system 100 includes transmitter 105 coupled to receiver 107. Transmitter 105 receives data from one or more channels 110 and transmit it over link 120 to receiver 107. In accordance with the present invention, transmitter 105 uses data packets to transmit data. As described below, the data packets used in system 100 follow a data transmission protocol ("DTP"), which provides efficient data transmission while maintaining a high level of data integrity. More specifically, upon receiving data from channels 110, transmitter 105 packetizes (or constructs) the received data into one or more packets using the DTP and transmits the packets to receiver 107 over line 120. Once received, the packets are de-packetized into (or reassembled into) the data using the DTP at receiver 107.

It should be noted that, as described below, the DTP allows data transmission over a serial data link. System 100, therefore, includes line 120 comprising Category-5 (or Cat-5) cable, along with standard Ethernet 100 Mbit PHY hardware. This configuration of link 120 comprising Cat-5 cable and the standard Ethernet 100 Mbit PHY hardware allows a 100 Mb serial data transmission rate between transmitter 105 and receiver 107. Furthermore, the configuration allows over 48 channels (i.e., audio channels) 110 to fit onto transmitter 105.

In accordance with the present invention, link 120 may comprise other types of communication medium, including without limitation, CAT-5 10-baseT, CAT-S 100-baseT, 1 gigabit Ethernet, 100 gigabit Ethernet, other versions of Ethernet, infra-red, RF, wired, wireless, optical, or laser link.

Data Transmission Protocol (DTP)

AS mentioned above, using the DTP, transmitter 105 received data from one or more input channels 110, packetizes the data, and transmits the packetized data to receiver 107. It should be noted that, in accordance with the present invention, the DTP has bi-directional capability and supports transmission and distribution of multiple types of data, such as audio data, video data, and other generic data, including control data. Some examples of data protocols supported are Musical Instrument Digital Interface (MIDI), USITT DMX512/1990 (DMX), mouse, keyboard, and proprietary system control data. In one aspect, the DTP is a protocol for multiplexing many channels of data—i.e., the DTP is used to receive data from multiple sources, packetize the data, transmit the packetized data over a serial data link, and de-packetize and reconstruct the source data.

In accordance with the present invention, as described further below, the DTP provides, among other things, a variable bit protection scheme, error detection and correction scheme, and data smoothing technique scheme. These schemes provided by the DTP facilitate efficient and effective data transmission and distribution while maintaining data integrity. In particular, the DTP allows a scalable data transmission and distribution (e.g., the number of data channels and the quality of data channels can be scaled) to suit a particular system configuration having a particular transmission line bandwidth.

It should be noted that a data packet, which follows the DTP, in accordance with the present invention, includes the payload that can be configured to best suit the given configuration of a given data transmission and/or distribution system. More specifically, the DTP provides, among other things, a payload structure that yields less delay time, more channels, and a higher sample rate, all of which may be required to suit the need of the given system configuration. In particular, the payload structure of the DTP is designed to withstand a noise burst, which can destroy over half of the payload, without having to interpolate a missed sample.

Figure 2:
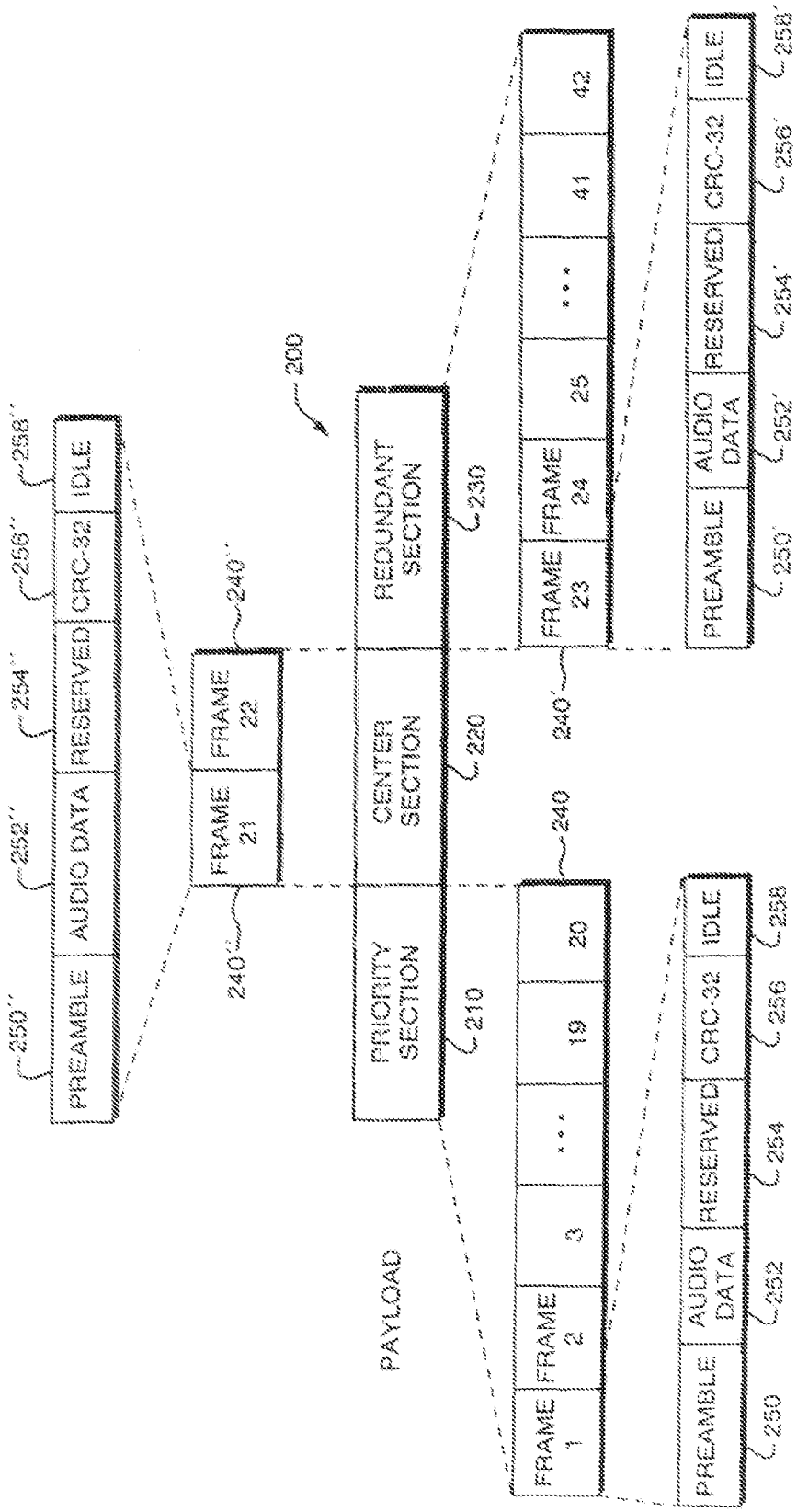
FIG. 2 is a diagram showing a detailed representation of the payload, in accordance with the present invention.

FIG. 2 shows the structure of payload 200 included in a data packet that follows the DTP to transmit data over a serial data link. Note that the embodiment of payload 200 as shown in FIG. 2 relates to receiving, packetizing, transmitting, and distributing 48 input channels of 24-bit audio data over Category-5 cable using standard Ethernet 100 Mbit PHY hardware. This configuration results in a 100 Mb serial data transmission rate.

It should be noted that the embodiment of payload 200 as shown in FIG. 2 represents one embodiment that is used to carry out the inventive concepts of the present invention, and, as such, there are multiple variations thereof within the scope and spirit of the present invention. For instance, while much of the description herein relates to transmission and/or distribution of audio data bits using payload 200, it should be noted that payload 200 is equally applicable to other types of data, such as video data and other generic data including control data. Furthermore, the DTP provides for, as noted, adjusting of channel count, channel quality, and channel type (audio data, video data, and/or control data), based on the available link bandwidth and desired system robustness (error immunity) for a given system's architecture and purpose. Accordingly, in other embodiments, payload 200 is used to received more than (or alternatively, less than) 48 channels of data.

In accordance with the present invention, payload 200 is designed to provide varying levels of protection on different sets of bits in payload 200. As described below, by "bit-splitting" audio data into several sets of varying priorities, the most important bits can be protected with an FEC algorithm and redundancy, the moderately important bits protected with redundancy alone, and the least important bits protected by that what is inherent within the transmission medium's physical layer. Using this variable bit protection scheme, payload 200 facilitates a robust data transmission and distribution within the time allotted while maintaining data integrity.

As shown in FIG. 2, payload 200 comprises three sections: priority section 210, center section 220, and redundant section 230. Redundant section 230 is an exact copy of priority section 210. The priority section 210 contains all of the critical data of payload 200. As noted, the "critical data" is the data that cannot be lost without having to inrterpolate missing data on the receiver, The ELR count, which is used to generate the L/R Clock on a receiver, for example, is contained in priority section 210.

Priority section 210 comprises twenty frames 240 (i.e., Frame Nos. 1-20). Note that each frame 240 in priority section 210 includes preamble 250, audio data 252, reserved data 254, and CRC-32 checksum 256. Also not that, for the purposes of completeness, idle time 258 is included at the end of each frame 240.

Audio data 252 includes, as described below, high priority bits of data required to deliver proper audio information. Preamble 250 comprises 8 bytes of preamble data that are defined by the Ethernet standard. The preamble data includes a sequence of bytes that the PHY Layer needs to see in order to recognize the start of frame 240. At the end of frame 240, the line must go idle for 960 ns, a period of time which is equivalent to 12 bytes. This period allows the PHY Layer to reset and begin searching for the next preamble.

Note that a 32-bit CRC value is included in CRC-32 checksum 256 of each frame 240. The 32 bit CRC serves as a first line of protection against data transmission errors. If the CRC for frame 240 is good, for instance, it is assumed that frame 240 is valid and no further error detection or data recovery needs to occur.

As noted, the DTP is a protocol for handling multiple channels of incoming data. Reserved data 254 includes a reserved space for accommodating additional or future data. In one embodiment, the ELR count resides in reserved data 254. In another embodiment, MIDI files use reserved data 254 during data transmission and/or distribution.

As noted, redundant section 230 of payload 200 contains an exact copy of the frames that appear in priority section 210. Thus, redundant section 230 comprises twenty frames 240' (i.e., Frame Nos. 23-42). Like that of priority section 210, each frame 240' in redundant section 230 includes preamble 250', audio data 252', reserved data 254', CRC-32 checksum 256', and idle time 258'.

It should be noted that, in accordance with the present invention, including a duplicate copy of priority section 210 in payload 200 provides a protection against two types of common errors: a burst error that can wipe out the entire set of frames in priority section 210 and a single bit error in preamble 250 that could cause a frame 240 to be dropped by the PHY Layer. These types of data transmission errors can be greatly minimized by including redundant section 240' in addition to priority section 240 in payload 200. For instance, after receiving packetized data, receiver 107 has several options if an error is detected. The first approach for error detection and recovery would be, as noted, to check the CRC (i.e., 32-bit CRC checksum 256) of priority frames 240. If the CRC is good, the priority frame 240 can be used. On the other hand, if the CRC is bad, the respective redundant frame 240' can be checked. If the redundant CRC is good, the respective redundant frame 240' can be used.

As shown in FIG. 2, payload 200 further comprises center section 220, which includes two (2) frames (i.e., Frame Nos. 21 and 22). Like that of priority section 210 and redundant section 230, each frame 240" in center section 220 includes preamble 250", audio data 252", reserved data 254", CRC-32 checksum 256", and idle time 258".

A method of bit-splitting sample data into multiple sections in payload 200, in accordance with the present invention, is described herein. AS noted, while the embodiment of payload 200 shown in FIG. 2 relates to 48-channels of input, the discussion that follows herein uses 1-channel for purposes of simplicity. Similarly, it should be noted that a total of 100 samples are used in the embodiment of payload 200 shown in FIG. 2. Thus, each frame 240 of priority section 210 includes five samples resulting in the total of 100 samples per priority section 210 (or five samples per frame times twenty frames). Likewise; the same number of samples exists in redundant section 230 since it is an exact copy of priority section 210. In accordance with the present invention, it should be noted that the number of samples per payload 200 could be modified. That is, the number of samples could be changed to another figure—e.g., 96 samples per payload 200. If 96 samples are used, for instance, priority section 210 would include 16 frames with 6 samples per frame 240.

As noted, each sample comprises 24-bit data. For bit-splitting purposes, each 24-bit sample is designated as having 11 bits of high priority data required to deliver proper audio information (to a receiver or other receiving unit) and 13 low priority data that adds dynamic range and definition. From the eleven bits in the high priority data, 9 bits are considered critical. Accordingly, these twenty-four bits can be divided into three sets of varying audio priorities—i.e., a first set having bits 1-9 that are high priority and critical, a second set having bits 10-11 that are high priority but non-critical, and a third set having bits 12-24 that are not high priority. These 24 bits can be treated differently based on the significance attached to each set of bits.

Figure 3:
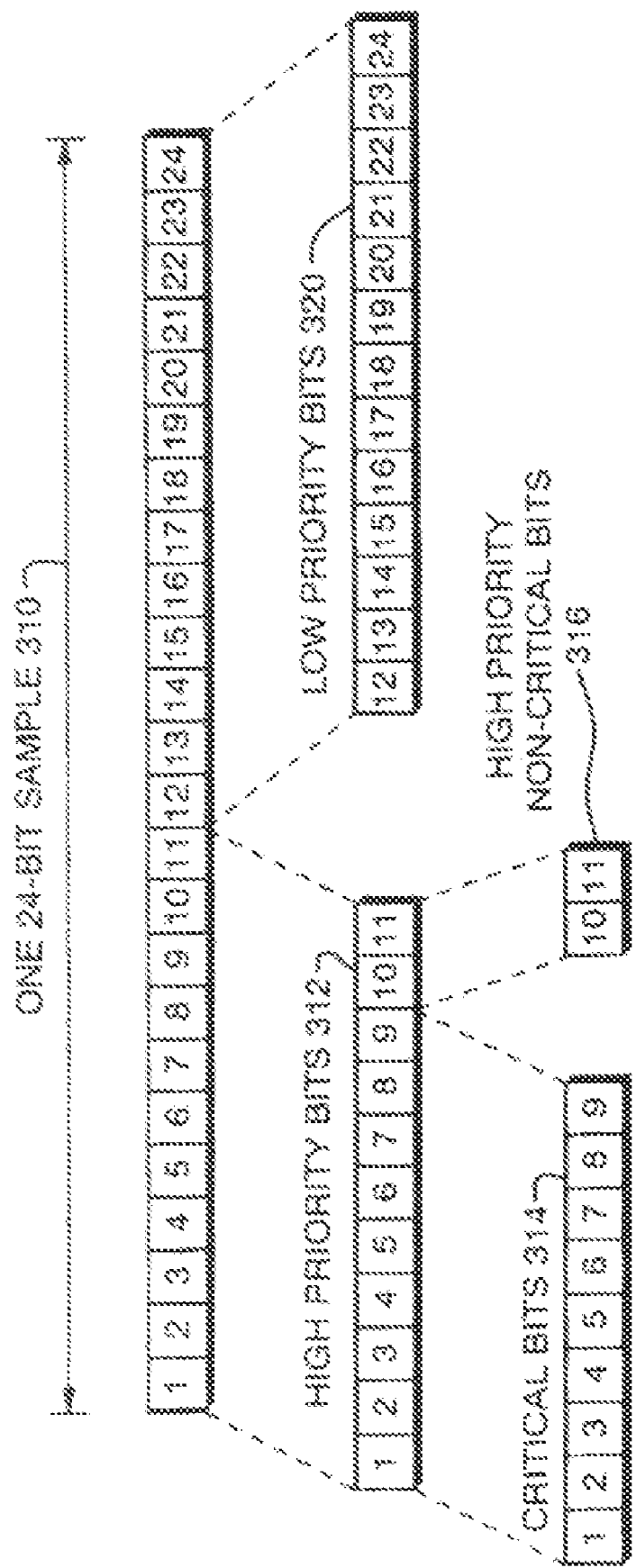
FIG. 3 is a diagram showing a detailed representation of one 24-bit sample used in the payload, in accordance with the present invention.

FIG. 3 is a detailed representation of one 24-bit sample data 310. In particular, FIG. 3 illustrates a scheme of splitting bits of sample data 310 into multiple sets of priorities. As shown, from 24-bit sample data 310, the first eleven bits are designated as high priority bits 312. Further, from the bits in high priority bits 312, the first nine bits are designated as critical bits 314 and the remaining two bits are designated as high priority, non-critical bits 316. The remaining 13 bits in sample data 310 (i.e., bits 12-24) are designated as low priority bits 320.

From each twenty-four bit sample, only the bits in high priority bits 312 (i.e., bits 1-11) are placed in priority section 210. The remaining bits of sample data 310 (i.e., the bits 12-24 in low priority bits 320) are placed in center section 220. It should be noted that the bits in high priority bits 312, by being placed in priority section 210, are transmitted twice—once in priority section 210 and then again in redundant section 230. Note that, from the eleven bits from high priority bits 312, only the bits from critical bits 314 (i.e., the bits 1-9) are given extra data protection (i.e., by encoding with an FEC algorithm). The remaining bits from high priority bits 312 (i.e., the bits in high priority, non-critical bits 316) are not encoded.

After the high priority bits (i.e., bits 1-11) of each sample are bit-split and placed into priority section 210, the remaining 13 bits of low priority bits (i.e., bits 12-24) of each sample are destined for center frames 240" in center section 220 (i.e., Frames 21 and 22). These low priority bits 320 are "sample split" into Frame 21 and Frame 22 in center section 220 so in the event that one of frames 240" is lost, only half of the samples will degrade to 11 bits of dynamic range.

Figure 4:
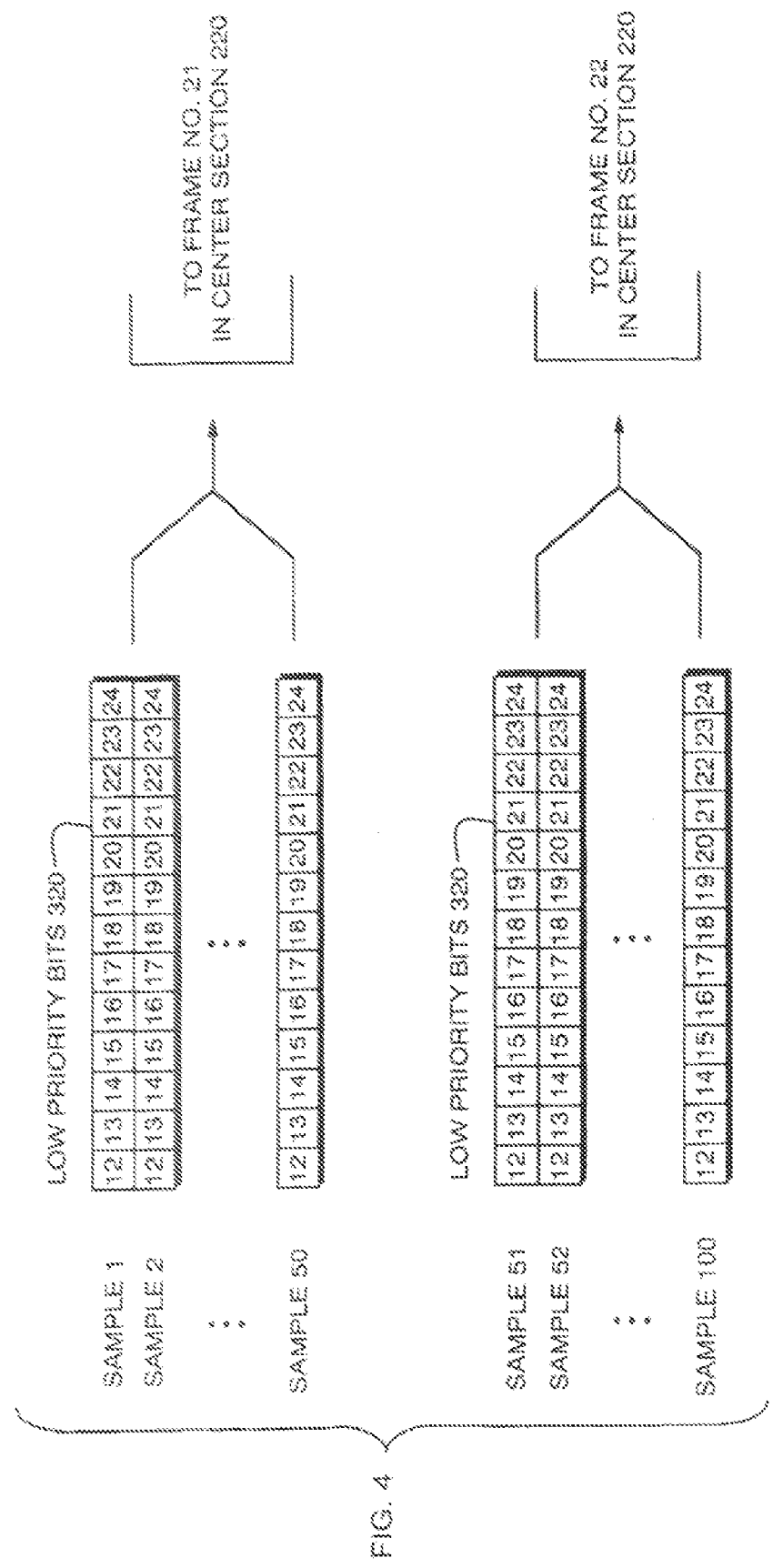
FIG. 4 is a diagram showing detailed representation of low priority bits used in the payload, in accordance with the present invention.

FIG. 4 shows a detailed representation of how low priority bits 320 of each sample are sample-split into Frames Nos. 21 and 22 in center section 220. As shown, the low priority bits 320 from samples 1-50 are placed in Frame No. 21 of center section 220. Similarly, the low priority bits 320 form samples 51-100 are placed in Frame No. 22 of center section 220. Accordingly, each of the two frames (i.e., Frames 21 and 22) in center section 220 contains the 13 bits of low priority bits 320 for 50 samples.

Accordingly, in accordance with the present invention, after receiving and packetizing data from all 48-channels, each frame 240 of priority section 210 comprises eight bytes in preamble 250, four hundred twenty (420) bytes of 11-bit high priority audio data and FEC bits in audio data 252, four bytes of checksum in CRC-32 checksum 256, and twelve bytes of time in idle time 258. Additionally, as noted, each frame 240 may also contain bytes in reserved data 254.

Likewise, in each frame 240' of redundant section 230, there are eight bytes in preamble 250', four hundred twenty (420) bytes of 11-bit high priority audio data and FEC bits in audio data 252', four bytes of checksum in CRC-32 checksum 256', and twelve bytes of time in idle time 258'. Also, each frame 240' may also contain bytes in reserved data 254'.

In addition, each frame 240" of center section 220 includes eight bytes in preamble 250", four bytes of checksum in CRC-32 checksum 256", twelve bytes of time in idle time 258", and thirty-nine hundred (3900) (or 13 bits of low priority bits times 50 samples times 48 channels divided by 8 bits per byte) of low priority audio data are placed in audio data 252".

In accordance with the present invention, it should be noted that, one of the advantages achieved by placing lower priority data bits 320 in center section 220 is to provide a length of time between priority section 210 and the subsequent redundant section 230. Center section 220 serves as a buffer to provide a cushion between the two copies of the high priority data bits 312. Under this scheme, payload 200 can lose either priority section 210 or redundant section 230 and still be able to provide 24-bit audio data. Similarly, payload 200 can lose either priority section 210 or redundant section 230 as well as center section 220 and still provide an 11-bit audio data sample. The placement of center section 220 between priority section 210 and redundant section 230 containing high priority data bits 312 minimizes the chance that a long noise burst would corrupt data from both priority section 210 and redundant section 230.

Furthermore, as noted, by further splitting center section 220 into two frames (i.e., Frames 21 and 22), the risk of an error burst causing the entire payload to drop to 11-bit resolution is minimized. While any error to center section 220 results in a loss of dynamics from 24 to 11 bits, this loss would only last for 1 ms if the error burst was limited to only one of the two center frames 240". In accordance with the present invention, it should be noted that the bits in low priority bits 320 could also be split by channel instead of by sample number. Under this configuration, (e.g., splitting the bits in low priority bits 320 by channel), the loss of resolution would go to 11 bits for the entire 2 ms payload time, but only half of the channels (i.e., 24 channels) would be affected.

Based on the foregoing, it should be apparent that there are several reasons for bit-splitting and sample-splitting audio data bit samples into multiple sections. First, by bit-splitting sample data 310, only the bits in high priority bits 312 are stored in priority section 210, thereby increasing the rate of data transmission while minimizing data transmission errors. Second, as described further below, the bits in critical data bits 314 (i.e., the first 9 bits in high priority bits 312) can be encoded with a forward error correction scheme that allows receiver 107 to detect and correct errors upon receiving the data. Furthermore, as described below, in accordance with the present invention, the method of including multiple samples in payload 200 facilitates interleaving of the samples, whereby no two consecutive samples are lost upon a loss of an entire frame of the interleaved samples. In fact, consecutive samples are guaranteed to be at least 4 frames apart.

In any event and in accordance with the present invention, in one embodiment, the bits in critical bits 314 of each sample are encoded with an FEC algorithm. Being the most critical audio data, these bits in critical bits 314 are encoded to allow recovery on the receiving side in the event that a bit is lost during transfer. Due to the nature of the FEC algorithm, 18 bits of raw data are required to perform the encoding. For that reason, in accordance with the present invention, the error encoding will take place on two samples.

In one embodiment, a 24/18 Hamming Code is used. This algorithm will take 18 bits of input data (i.e., the first 9 bits of 2 samples), and encode them with 6 check bits. The resulting output is a 24 bit stream of error encoded data. The 24/18 FEC algorithm will detect up to 2 bit errors within the 24-bit packet. It will be able to detect and correct 1 bit error within the 24-bit packet.

As noted, the structure or format of payload 200 shown in FIG. 2 represents one embodiment that is used to carry out the inventive concepts of the present invention, and that there are multiple variations thereof. Accordingly, payload 200 can be easily modified based on a particular system configuration. The size of payload 200, for example, can be increased to provide more error protection, if needed. While increasing the size of payload 200 may require more processing time and memory, larger payload 200 allows greater protection of critical data that can be retransmitted many times with full error detection and correction encoding.

Note that not only the size of payload 200 can be adjusted, but also the format of the data within payload 200 can be adjusted to provide various degrees of protection of the data. While much of the description herein pertains to transmitter 105 receiving 48- channel, 24-bit digital audio data, it should be noted that transmitter 105 can be adjusted to provide a greater protection over fewer channels. The channel count could be reduced, for example, from 48 to 16. The extra bandwidth within payload 200 could be used to provide redundant protection of more data bits within each sample. Likewise, in one embodiment, payload 200 can be formatted to offer an 8-bit audio data delivery system over 144 channels.

Data Interleaving

As noted, the method of including multiple samples in payload 200 facilitates interleaving of the samples. In accordance with the present invention, by interleaving the samples, no two consecutive samples are lost upon a loss of an entire frame of the interleaved samples during data transmission. This is so since, the system and method of interleaving data samples using the DTP ensures that consecutive samples are at least 4 frames apart from one another.

If an error burst takes out one frame 240 of data in priority section 210, a copy (i.e., frame 240') of this frame 240 is available in redundant section 230 within the same payload 200. However, there may be a situation where more protection is needed during data transmission. For instance, it an error burst was long enough to corrupt the entire priority section 210 and a second error burst destroyed one frame 240' within redundant section 230, then the entire five audio samples across all 48 channels in the frame 240 would be lost.

Normally, losing 5 samples within an audio data stream would be irrecoverable. However, by interleaving the samples across the entire priority section 210, a frame 240 can be lost in its entirety and the worst that can happen is that there would be 5 places on each channel within the 2 ms audio data stream where a single sample would need to be interpolated.

In accordance with the present invention, using a proper interleaving scheme, consecutive audio samples can be spread out to the point that a noise burst could destroy 4 consecutive frames of data and no two consecutive audio samples would be lost. These missing (non-consecutive) audio samples may then be more accurately reconstructed with interpolation.

Table 1 below shows an exemplary embodiment of the sample interleaving scheme, in accordance with the present invention, that will result in the maximum transmission time between consecutive audio samples. As shown below, each frame contains 5 samples (A-E). There are 20 frames in the priority section. Samples are numbered 1-100.

TABLE 1

| Frame # | Sample A | Sample B | Sample C | Sample D | Sample E |
|---------|----------|----------|----------|----------|----------|
| 1  | 03 | 23 | 43 | 63 | 83 |
| 2  | 07 | 27 | 47 | 67 | 87 |
| 3  | 11 | 31 | 51 | 71 | 91 |
| 4  | 15 | 35 | 55 | 75 | 95 |
| 5  | 19 | 39 | 59 | 79 | 99 |
| 6  | 01 | 21 | 41 | 61 | 81 |
| 7  | 05 | 25 | 45 | 65 | 85 |
| 8  | 09 | 29 | 49 | 69 | 89 |
| 9  | 13 | 33 | 53 | 73 | 93 |
| 10 | 17 | 37 | 57 | 77 | 97 |
| 11 | 04 | 24 | 44 | 64 | 84 |
| 12 | 08 | 28 | 48 | 68 | 88 |
| 13 | 12 | 32 | 52 | 72 | 92 |
| 14 | 16 | 36 | 56 | 76 | 96 |
| 15 | 20 | 40 | 60 | 80 | 100 |

TABLE 1-continued

| Frame # | Sample A | Sample B | Sample C | Sample D | Sample E |
|---------|----------|----------|----------|----------|----------|
| 16 | 02 | 22 | 42 | 62 | 82 |
| 17 | 06 | 26 | 46 | 66 | 86 |
| 18 | 10 | 30 | 50 | 70 | 90 |
| 19 | 14 | 34 | 54 | 74 | 94 |
| 20 | 18 | 38 | 58 | 78 | 98 |

In general and in accordance with the present invention, the exemplary embodiment of the sample interleaving scheme shown in Table 1 above can be established using the following algorithm. For a given payload of x frames per priority section and y samples per frame:

SAMPLES_PER FRAME=y;

FRAMES_PER_SECTION=X;

FRAME_SAMPLE_BIAS=*INT*(SAMPLES_PER_FRAME/2);

At initial startup, variables are initialized as follows:

Frame=0;

Frame_Sample=0;

Dest_Frame_Start=SAMPLES_PER_FRAME−FRAME_SAMPLE_BIAS;

Dest_Sample=Dest_Frame_Start;

Note that a buffer exists, Dest_Buffer, which is pointed to by Dest_Buffer_Prt. SAMPLE_SIZE is processor-dependent and is used for calculating the location of the new sample in the destination buffer. It represents the number of memory locations required to represent the sample. The algorithm runs as each sample is being loaded in the priority section of the payload.

```
/* Calculate destination buffer pointer based on Destination Sample number.*/
Dest_Buffer_Ptr = Dest_Buffer_Start + ((Dest_Sample −1) * SAMPLE_SIZE)
Copy the incoming sample to the destination buffer at the location pointed to by Dest_Buffer_Ptr.
/* Calculate Next Destination Sample Number */
Frame = Frame + 1
If (Frame_<FRAMES_PER_SECTION)
    If (Frame_Sample <(SAMPLES_PER_FRAME − 1)
        Frame_Sample = Frame Sample + 1
        Dest_Sample = Dest_Sample + FRAMES_PER_SECTION
    Else /* Calculate new Dest_Frame_Start */
        Dest_Frame_Start = Dest_Frame_Start − FRAME_SAMPLE_BIAS
        If (Dest_Frame_Start <= 0)
            Dest_Frame_Start = Dest_Frame_Start + SAMPLES_PER_FRAME
        Endif
        Dest_Sample = Dest_Frame_Start
    Endif
Else /* Last frame in transmission, payload interleaving complete */
    Frame = 0
    Frame_Sample = 0
    Dest_Frame_Start = SAMPLES_PER_FRAME − FRAME_SAMPLE_BIAS
    Dest_Sample = Dest_Frame_Start
Endif
```

Using the sample interleaving algorithm illustrated above, the risk of losing two consecutive samples can be greatly minimized. It should be noted, however, that the algorithm described above illustrates an exemplary algorithm, and, as such, there are multiple variations of algorithms that can be used with the present invention and within the scope and spirit of the present invention. For instance, it should be noted that while the system and method of sample interleaving, including the algorithm shown above, related to the samples in priority section 210 and redundant section 230, the system and method of sample interleaving, in accordance with the present invention, are equally applicable to the samples in center section 220. That is, the system and method of the present invention can be used to interleave not only the high priority bits in priority section 210 (and redundant section 230), but also the low priority bits in center section 220.

Data Clock Recreation

In accordance with the present invention, a system and method is provided for transmitting data over an asynchronous link that provides a synchronous recreation of the transmitter's data clock at a receiver. In one aspect, the system and method of the present invention can be used to recreate (or regenerate) the transmitter's data clock in the receiver with nothing more than the Ethernet clock (or any system clock— i.e., a transmission clock—that is recovered by the receiver for a non-Ethernet system).

Figure 5:
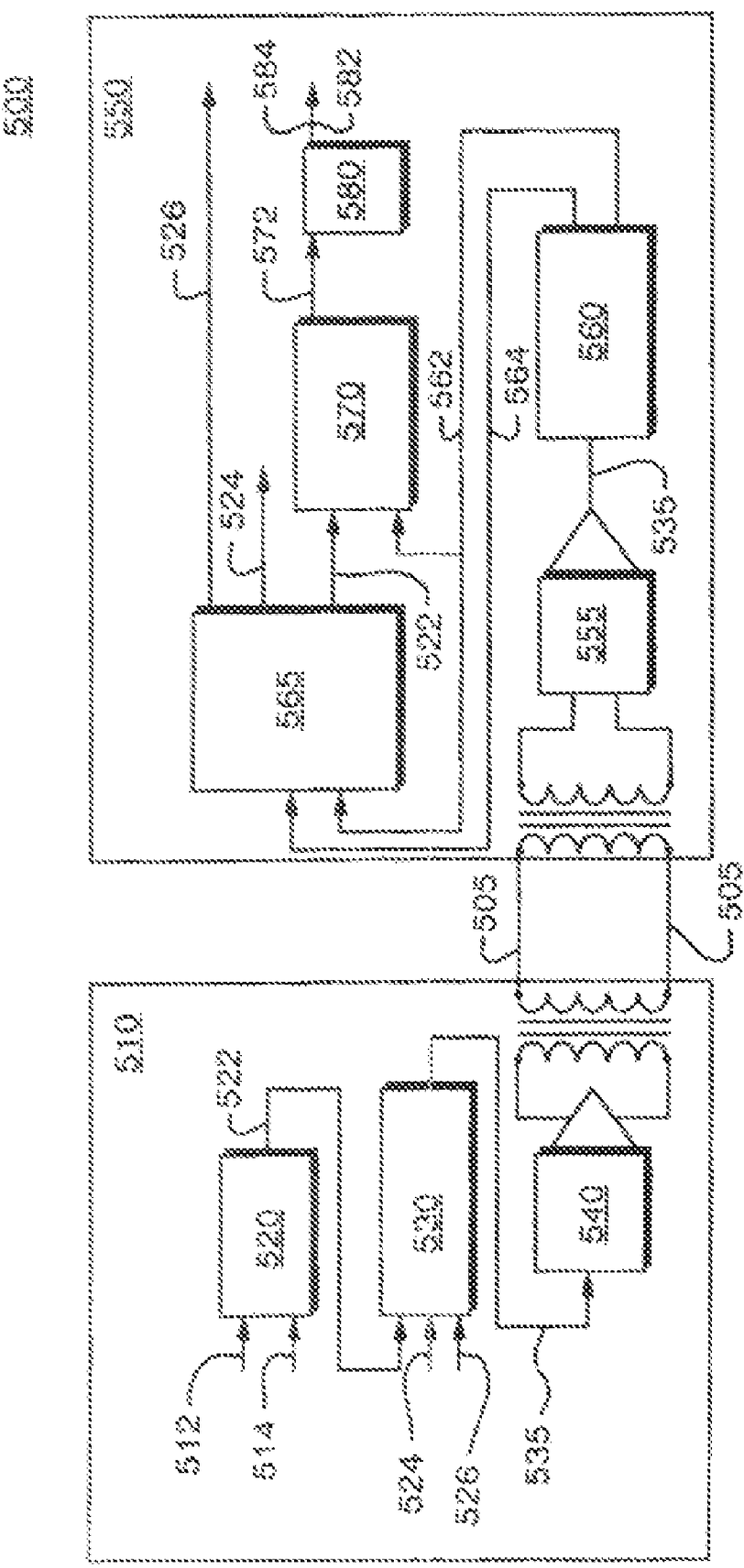
FIG. 5 is a block diagram showing a data transmission and data clock recreation system, in accordance with the present invention.

FIG. 5 shows data transmission and data clock recreation system 500, in accordance with the present invention. As shown, transmitter 510 is coupled to receiver 550 over link 505. In accordance with one aspect of the present invention, link 505 comprises any asynchronous link, including without limitation, a transformer, optical, or RF isolated data connection.

It should be noted that the embodiment of system 500 of FIG. 5 represents one embodiment that is used to carry out the inventive concepts of the present invention, and, as such, there are multiple variations thereof within the scope and spirit of the present invention. For instance, while much of the description herein relates to transmitting and recreating an audio data clock, system 500 of the present invention can be used to transmit and recreate a video clock.

As shown, transmitter 510 comprises, among other things, count generator 520, data packetizer 530, and Ethernet PHY 540. Count generator 520 received signals from audio data clock 512 and Ethernet clock 514 and generates count values 522. Note that Ethernet clock 514 drives Ethernet PHY 540 and that audio data clock 512 drives A/D's (not shown here). It should be noted that audio data clock 512 and Ethernet clock 514 are asynchronous.

Audio data clock 512 represents a clock that is synchronized with data (i.e., audio data 526) going into transmitter 510. Audio data clock 512 may comprise any clock, including without limitation, a L/R clock, bit clock, or master clock, that is associated with the data (i.e., audio data 526) from which all other data timing signals (i.e., count value 522) can be generated. In the embodiment of system 500 shown in FIG. 5, audio data clock comprises the L/R clock.

To generate count values 522, count generator 520 compares and counts the number of asynchronous Ethernet clocks 514 per each audio data clock 512. More specifically, count generator 520 re-clocks audio data clock 512 with Ethernet clock 514. Doing so creates re-clocked audio data clock 572. It should be noted that, in accordance with the present invention, re-clocked audio data clock 572 is edge-synchronous with Ethernet clock 514 and comprises the same asynchronous frequency as the original audio data clock 512. In other words, re-clocked audio data clock 572 represents audio data clock 512 with jitter. Thereafter, count generator 520 counts the number of Ethernet clock 514 cycles per audio clock 512 cycle and transmits the resulting count value 522 to data packetizer 530.

As shown, data packetizer 530 receives the count value 522, along with generic data 524 and audio data 526. Note that audio data 526 enters transmitter 510 through an A/D converter (not shown) and is digitized. Data packetizer 530 packetizes the count value 522, generic data 524, and audio data 526 into a payload. Accordingly, the payload now contains the count value 522 that will be used to generate the L/R Clock for that payload. In other words, the count value 522 is transferred to receiver 550 via the payload.

The packetized payloads 535 are then sent to Ethernet PHY 540. As noted, the Ethernet PHY 540 is the lowest hardware layer where data meets the wire. This layer conveys the bit stream, including electrical impulse, light or radio signal, through the network at the electrical and mechanical level. The packetized data 535 is transmitted to receiver 550 via link 505.

Upon receiving the packetized data 535, receiver 550 synchronizes its local Ethernet clock 562 to the packetized data 535. In other words, Ethernet clock 514 from transmitter 510 and Ethernet clock 562 from receiver 550 are synchronized and locked with one another. Upon synchronization, receiver Ethernet PHY, which includes PHY receiver 555 and recovery unit 560, recovers and transmits the Ethernet data 564 and Ethernet clock 562 to data de-packetizer 565. After receiving the Ethernet data 564 and Ethernet clock 562, data de-packetizer 565 separates the count value 522, generic data 524, and audio data 526.

Thereafter, data de-packetizer 565 sends the count value 522 to audio data clock generator 570, which, as shown uses the count value 522 and Ethernet clock 562 (from recovery unit 560) to create the re-clocked audio data clock 572. It should be noted that the re-clocked audio data clock 572 is recreated (or regenerated) to represent the original audio data clock 512 by changing edges based on the count value 522. In other words, re-clocked audio data clock 572 is edge-synchronized with the recovered Ethernet clock 562, and, as such, represents an accurate representation of the original audio data clock 512, but with jitter.

PLL circuit 580 received audio data clock 572 and removes the jitter. That is, using re-clocked audio data clock 572, PLL circuit 580 provides jitter free data clock 582 and a higher frequency master clock 584. By using the jitter free audio data clock 582 and master clock 584, all other data timing signals can be reproduced. In other words, the jitter free audio data clock 582 can be used to create master clock 584 for driving D/A's (not shown) in receiver 550. It should be noted that, therefore, jitter free audio data clock 582 and master clock 584 are synchronous with the audio data 526 transmitted from data de-packetizer 565.

As noted, while much of the description herein relates to transmitting and recreating audio data clock, system 500 of the present invention can be used transmit and recreate video data clock and that there are other variations of recreating the data clock thereof that incorporate the inventive concept of the present invention and are within the scope and spirit of the present invention.

Personal Mixing and Distribution System

Figure 6:
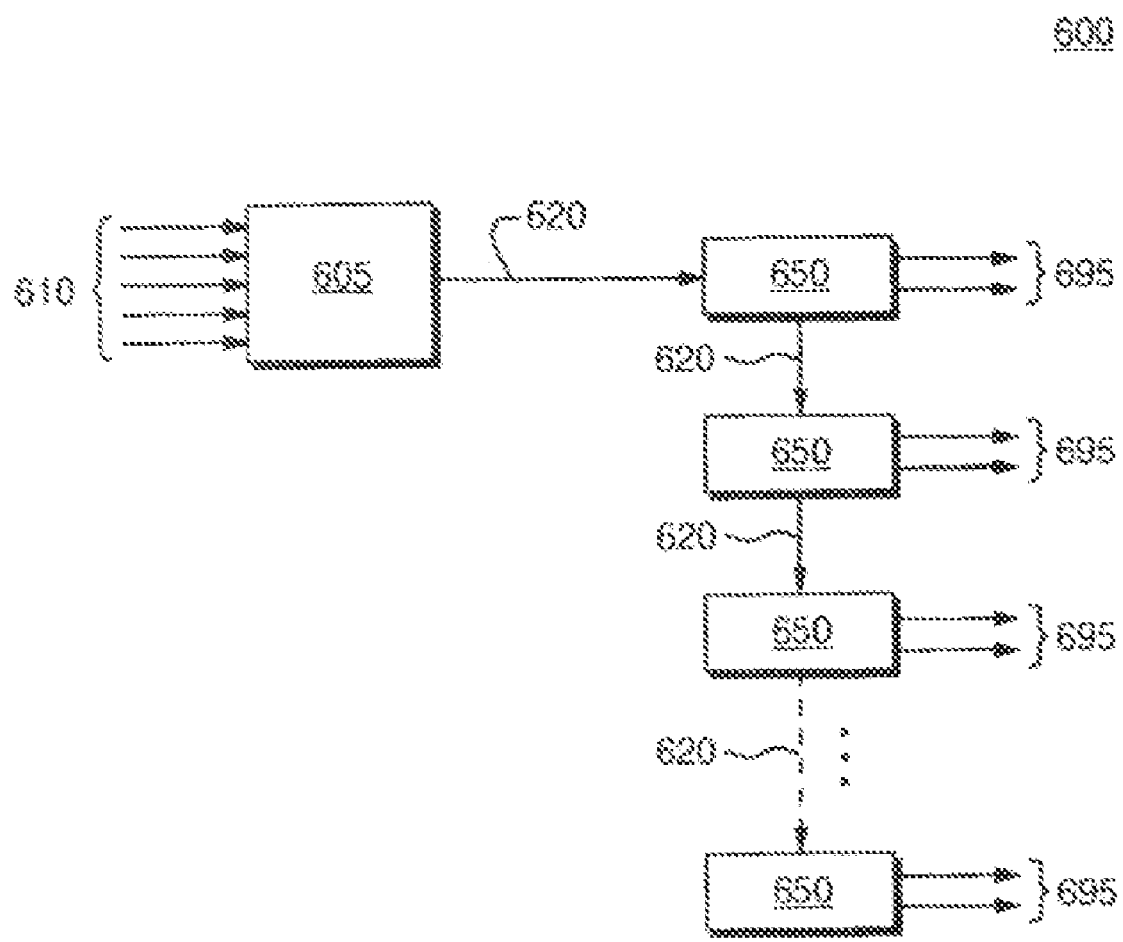
FIG. 6 is a diagram showing one embodiment of a data mixing and distribution system, in accordance with the present invention.

In accordance with the present invention, FIG. 6 shows one embodiment of personal mixing and distribution system 600 that can be used to transmit and distribute data over multiple receivers. It should be noted that system 600 represents one embodiment that is used to carry out the inventive concepts of the present invention, and, as such, there are multiple variations thereof within the scope and spirit of the present invention. For instance, while FIG. 6 shows only four receivers 650, the number of receivers 650 can be, in accordance with present invention, easily increased or decreased depending on the system configuration. Likewise, the number of input channels 610 can be easily increased or decreased depending on the system configuration.

As shown in FIG. 6, in accordance with the present invention, transmitter 605 takes one or more audio data channels 610 and packetizes the data. It should be noted that transmitter 605 can received over 48 high-quality digital audio channels 610, making system 600 suitable for multi-channel professional audio solutions. The packetized data is transmitted to receivers 650 over link 620. It should be noted that while the embodiment of system 600, as shown in FIG. 6, follows the DTP, system 600, in accordance with the present invention, can follow other protocols, including without limitation, traditional Ethernet.

In accordance with the present invention, link 620 comprises a high speed, serial data transmission link. The embodiment of system 600, as shown in FIG. 6, includes link 620 comprising Category-5 cable in conjunction with standard Ethernet 100 Mbit PHY hardware. This configuration provides a 100 Mb serial data transmission rate. It should be noted that, however, in accordance with the present invention, link 620 may include any one or more of Cat-5/PHY in a 10 Mbit or 1000 Mbit form, IR, Wireless (e.g., 802.11 link), or laser.

It should be noted that, in system 600, transmitter 605 is connected to a group of receivers 650 via link 620 in a daisy-chain configuration. As described below, using the DTP in a daisy-chained configuration, each receiver 650 can provide dynamic and intelligent scaling functions to its output channels 695. In particular, each receiver 650 can monitor the error counts in real-time as it received data. More specifically, receivers 650 can receive the data, analyze the payload for the priority information (e.g., channel count, audio fidelity, error tolerance, etc.), and then feed back control data to transmitter 605, instructing transmitter 605 to dynamically scale the payload to provide the best payload format to achieve the desired results in the given environment. Alternatively or additionally, receivers 650 may simply feed back the raw error count information, leaving the analysis and subsequent scaling decision algorithm to transmitter 605.

In accordance with the present invention, as long as transmitter 605 provides a format identifier with the packet, receivers 650 can be grouped so that one receiver 650 can receive a specific set of channels 610 at one quality level, while another receiver 650 gets another quality level of audio data over a different set of channels 610. With this flexibility, system 600 can be adapted to a variety of environments and/or applications. For instance, in accordance with the present invention, each receiver 650 can craft a unique mix of audio data that does not affect the mix of the other receivers 650 and can be controlled by separate users.

In particular, under the configuration of system 600, each receiver 650 can read the data transmitted from transmitter 605 and then immediately pass the data to additional receivers 650. In other words, this configuration allows each receiver 650 to "tap" off the packetized data transmitted from transmitter 605 (or from other receivers 650) and read the specific channels 610 as desired. Also, two of more receivers 650 can receive the data transmission and de-packetize (or reconstruct) the data simultaneously. Thereafter, each receiver 650 can mix the data to suit the respective local listening environment serviced by one or more output channels 695. Alternatively or additionally, in one embodiment, each receiver 650 can tap into a common set of digital channels generated by transmitter 605 and, thereafter, each receiver 650 can output one or more signals form the common set of digital channels.

It should be noted that, in accordance with the present invention, system 600 allows each receiver 650 to employ a standard analog master gain control. Alternatively or additionally, system 600 allows each receiver 650 to employ output circuit 677, which, in one embodiment, comprises a digitally controlled analog master audio gain control that can be used to provide an auto-gain adjustment system. This means that, each receiver 650 can provide intelligent functionalities.

For instance, at each receiver 650, as the volume of a specific channel 610 is increased to the point of near clipping, that channel 610 can be effectively limited while other remaining channels 610 are reduced in volume, maintaining the desired relative level between all of the channels 610. To assure that the user (at output channels 695) perceives the change as an increase in the desired channel, the digitally controlled post D/A's master volume is then increased accordingly by the digitally controlled analog master audio gain control 677.

In other words, system 600 allows each receiver 650 to automatically adjust itself to keep an overall output volume constant when an individual channel 610's volume is raised to its maximum digital level. Thereafter, system 600 automatically lowers the digital volume levels of all other channels 610 and raises the master gain, thereby effectively raising the volume of the channel 610 that is at its maximum digital level thus allowing greater dynamic range control of the digital mix.

Figure 7:
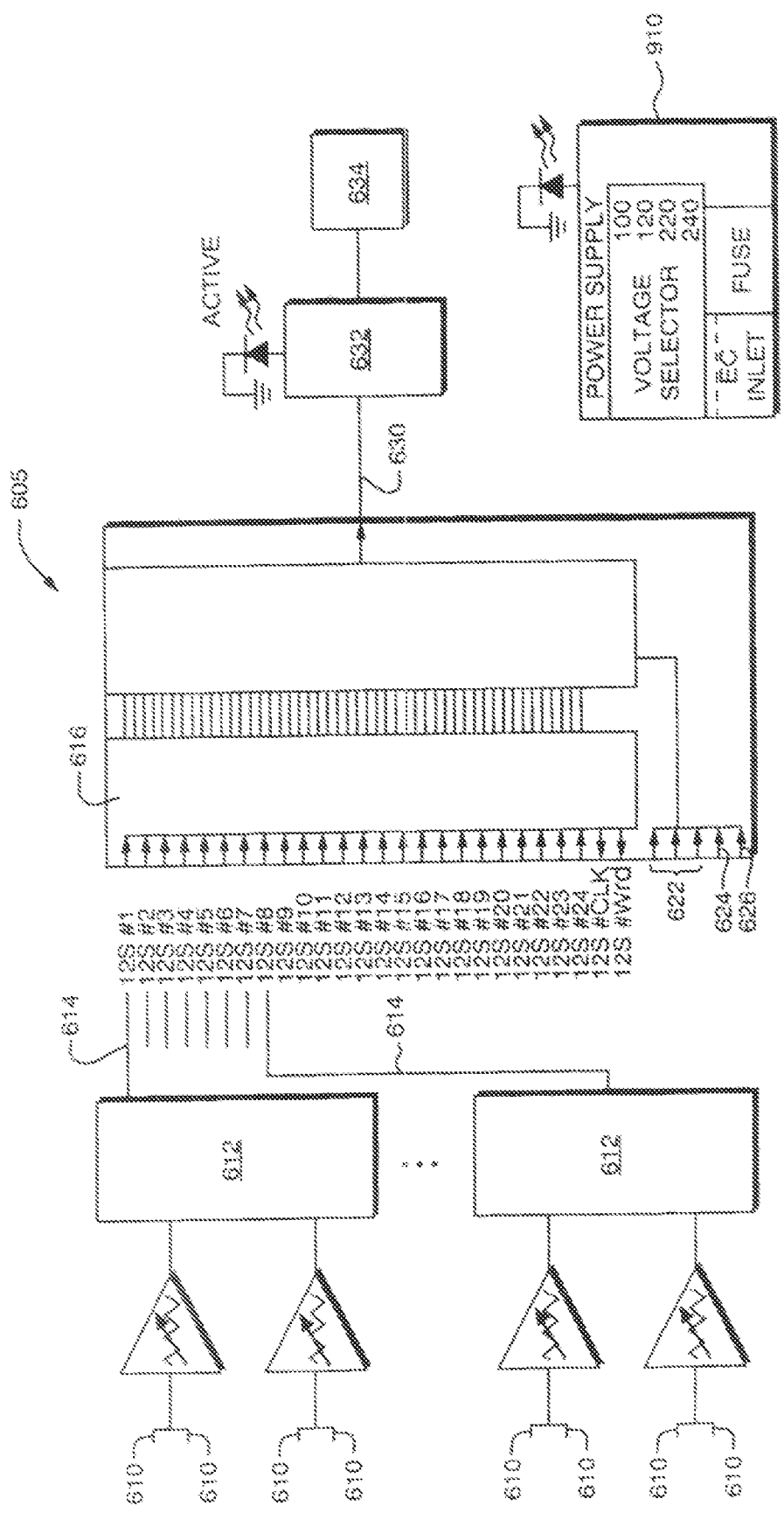
FIG. 7 is a block diagram showing an expanded view of the transmitter in FIG. 6, in accordance with the present invention.

In accordance with the present invention, FIG. 7 shows an expanded view of transmitter 605 of FIG. 6. As shown, audio data enters transmitter 605 through one or more channels 610. Thereafter, the data is digitized using one or more A/D converters 612. The digitized data is transmitted to transmitter ASIC 616 over a serial bus 614. In accordance with the present invention, bus 614 comprises Inter-IC Sound (I2S), which typically handles audio data separately from clock signals. It should be noted that optional serial data 622, word clock 624, and/or video sync 626 can also drive transmitter ASIC 616.

Thereafter, transmitter ASIC 616 packetizes the digitized data. During this process, transmitter ASIC 616 converts digitized audio data into data packets. Note that transmitter ASIC 616 interfaces to transmitter Ethernet PHY 632 through a standard Ethernet MII interface 630. Accordingly, the packetized data is passed from transmitter ASIC 616 to transmitter connector 634 through Ethernet MII interface 630 and transmitter Ethernet PHY 632. In accordance with the present invention, transmitter connector 634 comprises an RJ-45 Category-5 approved connector. It should be noted, as described below, there is a power supply circuit 910 supplying power to transmitter 605.

Figure 8:
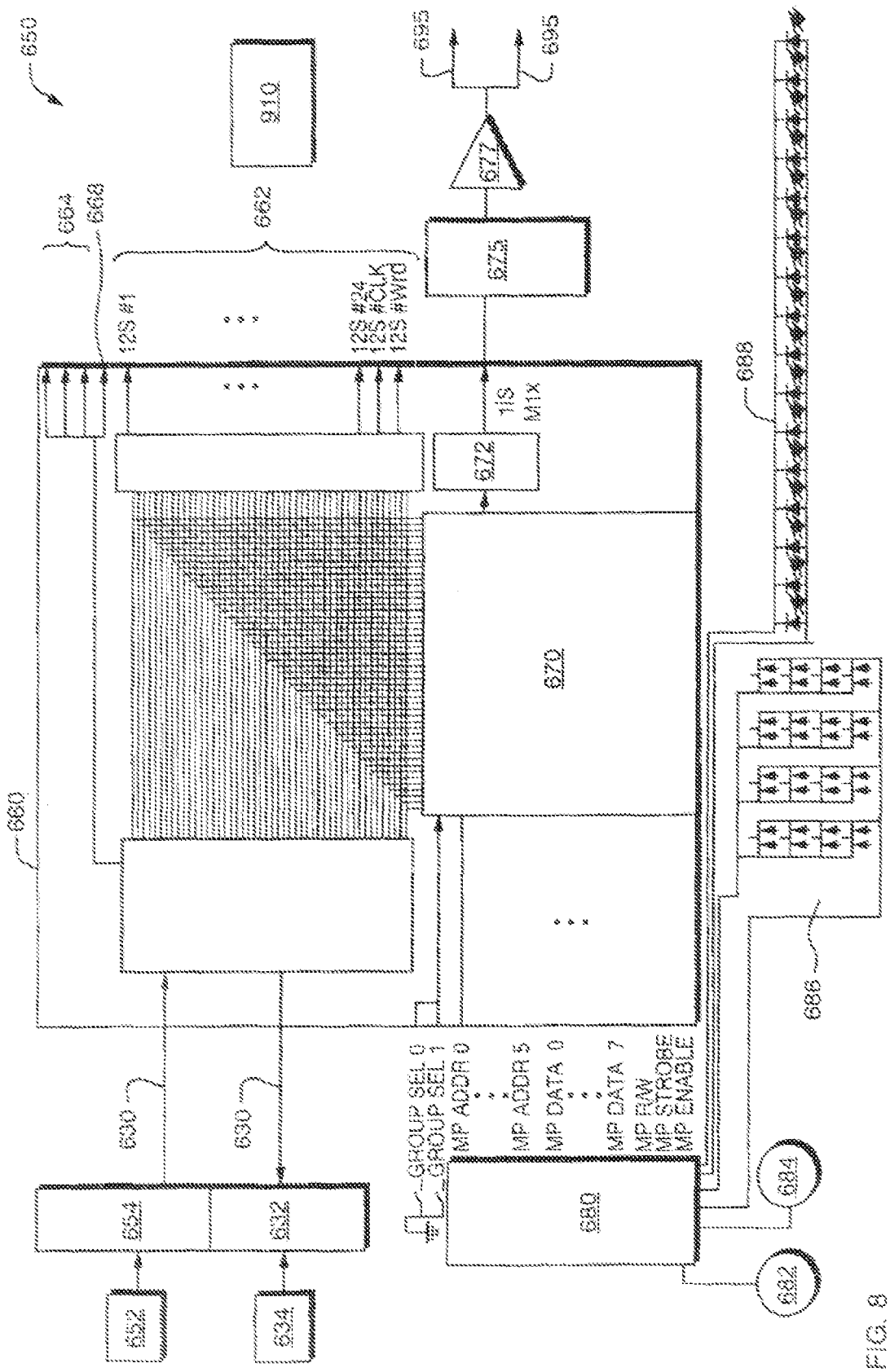
FIG. 8 is a block diagram showing an expanded view of the receiver in FIG. 6, in accordance with the present invention.

In accordance with the present invention, FIG. 8 shows an expanded view of a receiver 650 shown in FIG. 6. As shown, the data enters receiver 650 through receiver connector 652. Like transmitter connector 634, receiver connector 652 comprises an RJ-45 Category-5 approved connector. Note that transmitter Ethernet PHY 654 interfaces with receiver ASIC 660 through a standard Ethernet MII interface 630.

It should be noted that, in accordance with the present invention, the transmission (of data) is immediately repeated, with virtually no delay, to transmitter Ethernet PHY 632 and to transmitter connector 634. The repeated transmission is destined to additional receivers 650.

In any event and in accordance with the present invention, after receiving the transmission, receiver ASIC 660 de-packetizes (or reconstructs) the data. During this time, receiver ASIC 660 performs an error detection and correction (EDAC) process, following the DTP. Following the EDAC process, receiver ASIC 660 presents individual I2S audio signals 662, serial data 664, and word clock outputs 668.

It should be noted that in the embodiment of receiver 650, as shown in FIG. 8, receiver ASIC 660 performs digital mixing of forty-eight audio channels with mixer 670. Thereafter, receiver ASIC 660 presents a single I2S output 672 to a stereo D/A converter 675 and the optional digitally controlled analog master audio gain control at output circuit 677. As noted, the final output is transmitted to one or more output channels 695.

It should also be noted that, in one embodiment, mixer 670 is large enough to accommodate more audio channels (i.e., up to the number of channels in the input stream). As shown further in FIG. 8, in accordance with the present invention, receiver 650 includes microprocessor 680, volume rotary encoder 682, pan rotary encoder 684, buttons 686, and LEDs 688. Receiver 650 also includes a power supply circuit 910 supplying power to receiver 650.

Data Distribution and Mixing System

In accordance with the present invention, a novel system and method of using the DTP to transmit and distribute audio or video data over a network having multiple modules is provided. In particular, a novel system and method of using serial data links to communicate with functional mixing blocks, such as input modules, master modules, receivers, mixers, and/or controls surfaces is provided.

Figure 9:
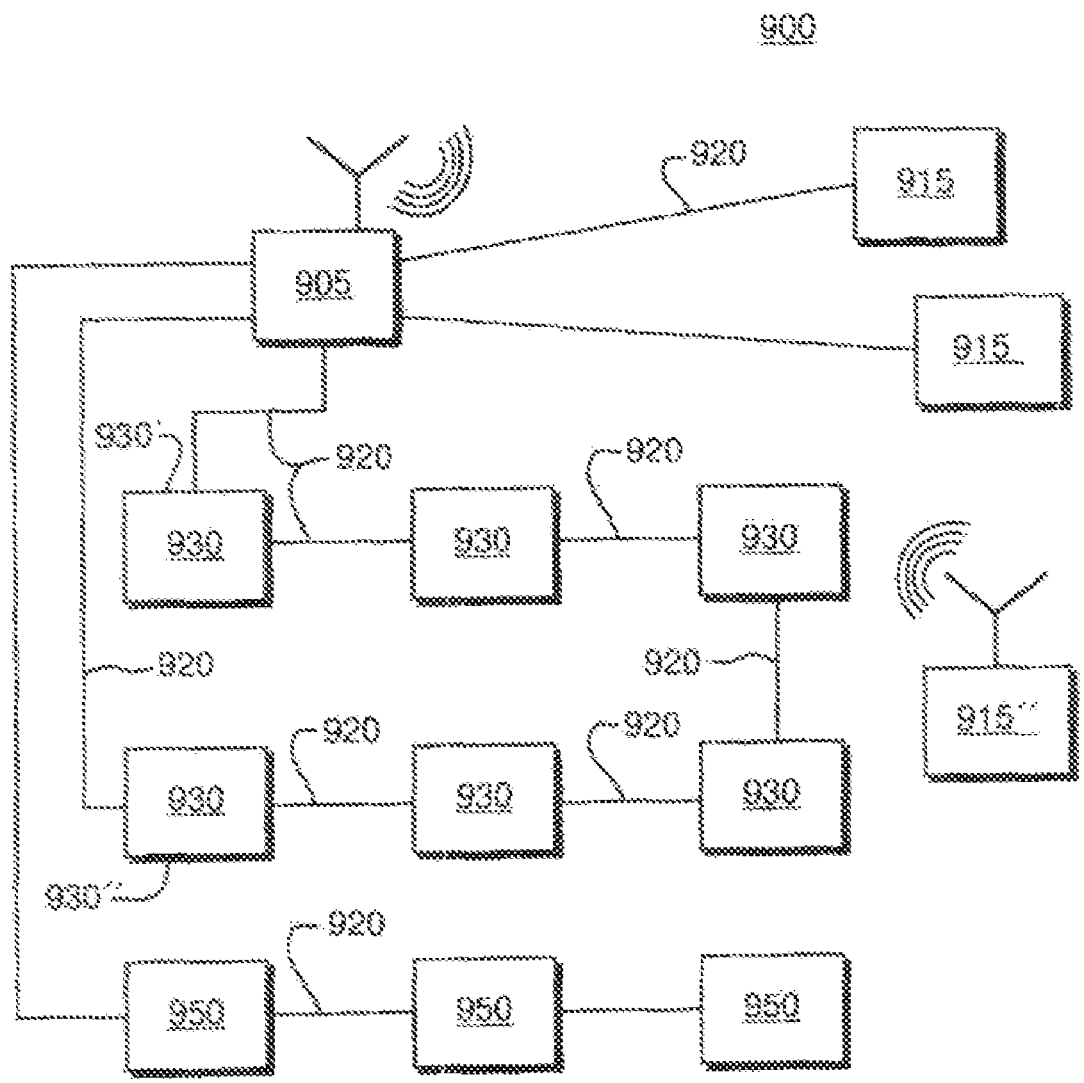
FIG. 9 is a block diagram showing another embodiment of a data mixing and distribution system, in accordance with the present invention.

FIG. 9 illustrates data distribution and mixing system 900 that uses the DTP to, among other things, receive, transmit, distribute, and mix audio or video data. It should be noted that the configuration of system 900 represents one embodiment that is used to carry out the inventive concepts of the present invention, and, as such, there are multiple variations thereof within the scope and spirit of the present invention.

As described, audio mixers, in general, have all input and output connectors in one physical package and in relatively close proximity to one another. Also, audio mixers typically have their control elements integrated into the same physical package as their input and output connections, and, as such, all control is performed from a central location. Therefore, input signals are carried from their origin to the mixer over a relatively long distance using analog or digital cables. Similarly, output signals from the mixer are carried to their destinations over a relatively long distance using analog or digital cables. As a result, an audio mixer system may comprise a complex set up, including many cables that are costly and prone to damage.

In accordance with the present invention, data distribution and mixing system 900 can be used in such a situation to communicate with functional mixing blocks over a serial data link. In particular, system 900 comprises multiple control surfaces that can control all or part of system 900 simultaneously or separately from different physical locations.

As shown in FIG. 9, data distribution and mixing system 900 includes master module 905, input modules 930, and receivers 950. Input modules 930 are linked to one another in a daisy-chained configuration and operatively coupled to master module 905 via link 920. Similarly, receivers 950 are linked to one another in a daisy-chained configuration and operatively coupled to master module 905 via link 920. In accordance with the present invention, link 920 comprises a high speed, asynchronous serial link, such as CAT-5 10-baseT, CAT-5 100-baseT, 1 gigabit Ethernet, 100 gigabit Ethernet, other versions of Ethernet, infra-red, RF, wired, wireless, optical, or laser link.

In accordance with the present invention, the functions of master module 905, which acts as a mixer, can be controlled remotely by primary control surface 915 and/or secondary control surface 915'. Alternatively or additionally, the functions can be controlled wirelessly by wireless control surface 915". Note that primary control surface 915, secondary control surface 915', and wireless control surface 915" are sometimes collectively referred to as control surfaces 915. The link between master module 905 and control surfaces 915 can provide audio as well as control data, thereby allowing remote effects units to be local to control surfaces 915. It should be noted that, in accordance with the present invention, different control surfaces 915, 915', and 915" can use different transmission media, with different bandwidth to connect to master module 905. It should also be noted that any number of the control surfaces 915 can be added to master module 905.

As described in more detail below, in accordance with the present invention, master module 905 gathers all of the control information from control surfaces 915. Thereafter, master module 905 initiates the mixing process by adding any input signals created in master module 905 to mix busses dictated by the control data gathered from control surfaces 915.

Figure 10:
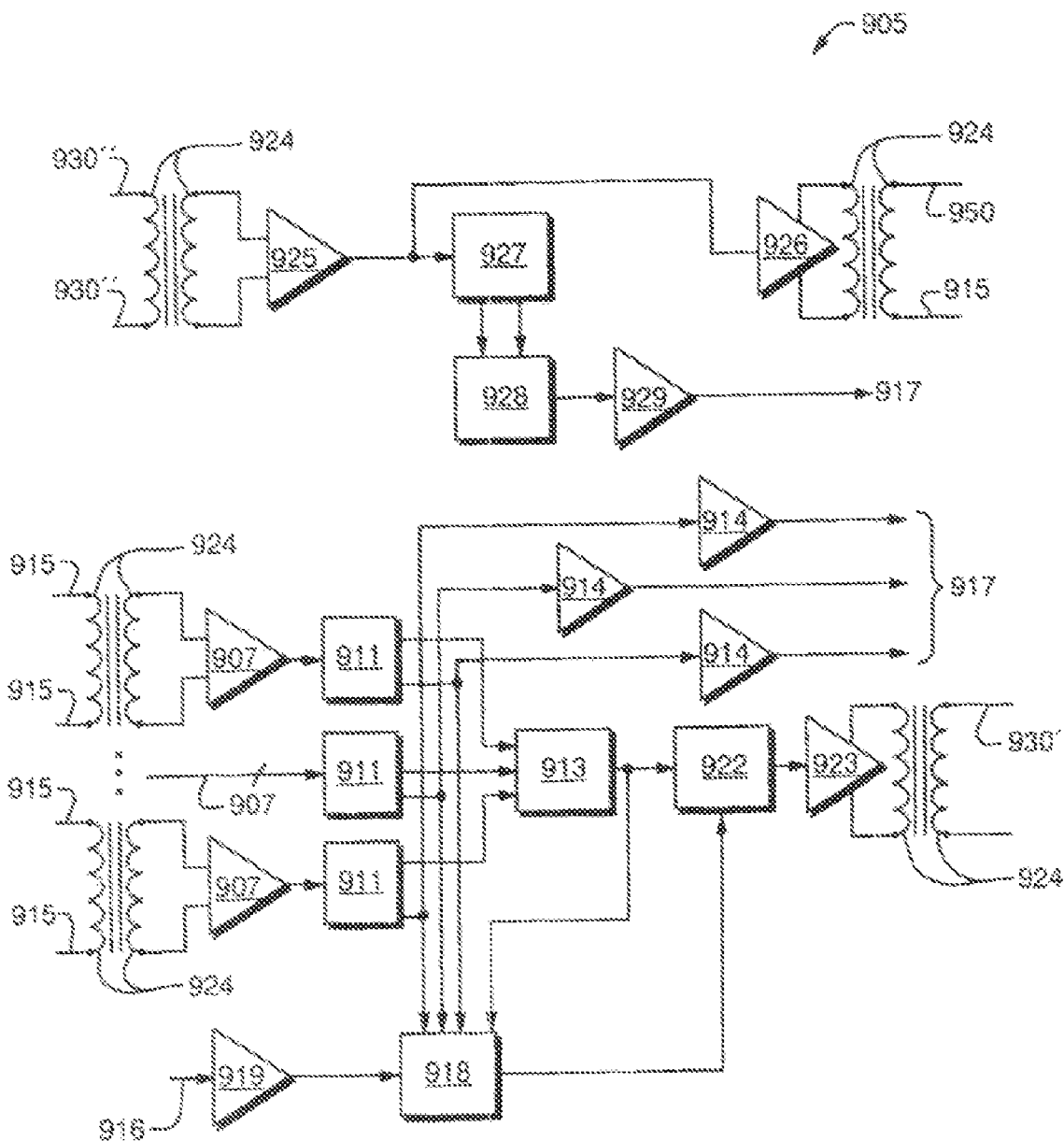
FIG. 10 is a block diagram showing an expanded view of the master module in FIG. 9, in accordance with the present invention.

A detailed illustration of master module 905 of system 900, distributing and mixing audio data is shown in FIG. 10. It should be noted that the embodiment of master module 905, as shown, is an exemplary embodiment, and, as such, there are multiple variations thereof within the scope and spirit of the present invention. For instance, while the discussion herein relates to audio data, master module 905 can be used to distribute and mix other types of data, including without limitation, video data.

As noted, master module 905 gathers all of the control information from control surfaces 915. Accordingly, as shown in FIG. 10, master module 905 gathers the control data (and audio if necessary) from control surfaces 915 via inputs 907. As shown, inputs 907 are communicatively coupled to connectors 924. Multiple inputs 907 are provided to support simultaneous connections to control surfaces 915.

Once received, the data are sent to data de-packetizers 911, which de-packetize and separate the control data and audio data. The control data are merged in control data merger 913. In accordance with the present invention, data de-packetizers 911 may also drive D/A circuits 914 to provide additional analog outputs without using busses on asynchronous serial data link 920. The output from D/A circuits 914 is provided to local audio outputs 917.

Note that master module 905 starts the mixing process by mixing any local input signals 916 to master module 905 and any audio data from control surfaces 915 that is destined to mix busses, in digital audio mixing block 918. Also note that, in one embodiment, input circuit 919 comprises a digitally remote controlled microphone preamp. In accordance with the present invention, the digitally remote controlled microphone preamp can be controlled remotely from any one of control surfaces 915, 915', 915" such that control data is sent from any one of control surfaces 915, 915', 915" to adjust the microphone preamp's gain at master module 905.

In any event and in accordance with the present invention, note that digital audio mixing block 918 also provides equalization (EQ) and effects. Thereafter, master module 905 takes this mixed audio and control information and packetizes them in data packetizer 922 for transmission (over link 920) via output driver circuit 923. It should be noted that link 920 carries actual mixing bus information as well as control data through system 900. In one embodiment, output driver circuit 923 is communicatively coupled to connector 924, which couples to the first input module 930 in system 900.

Referring again to FIG. 9, note that the output from data packetizer 922 of master module 905 is connected to the first input module 930. As shown, the first input module 930 is also designated as input module 930'. Using the daisy-chained topology, the output from data packetizer 922 is conveyed to other input modules 930 in the chain until it reaches the last input module 930, which is also designated as input module 930".

Last input module 930" then sends the data to master module 905 over link 920 via data input circuit 925. As shown, data input circuit 925 is communicatively coupled to connector 924. The data is then split and sent to output circuit 926 communicatively coupled to receivers 950 and/or control surfaces 915. The other part of the split data is sent to de-packetizer 927, which splits the data into audio data and control data and drives digital audio mixing block 928. It should be noted that, in accordance with the present invention, the data is split to make local audio outputs 917 on master module 905. Accordingly, digital audio mixing block 928 mixes, adds EQ and effects, and drives D/A 929 to provide analog audio outputs to local audio outputs 917.

It should be noted, in accordance with the present invention, connectors 924 comprise any link, including without limitation, a transformer, optical, or RF isolated data connection.

Recall that the output from data packetizer 922 (in master module 905) is sent over link 920 to first input module 930'. This data is conveyed to all input modules 930 and eventually reaches last input module 930". Last input module 930" then conveys the data back to master module 905 at data input circuit 925.

Figure 11:
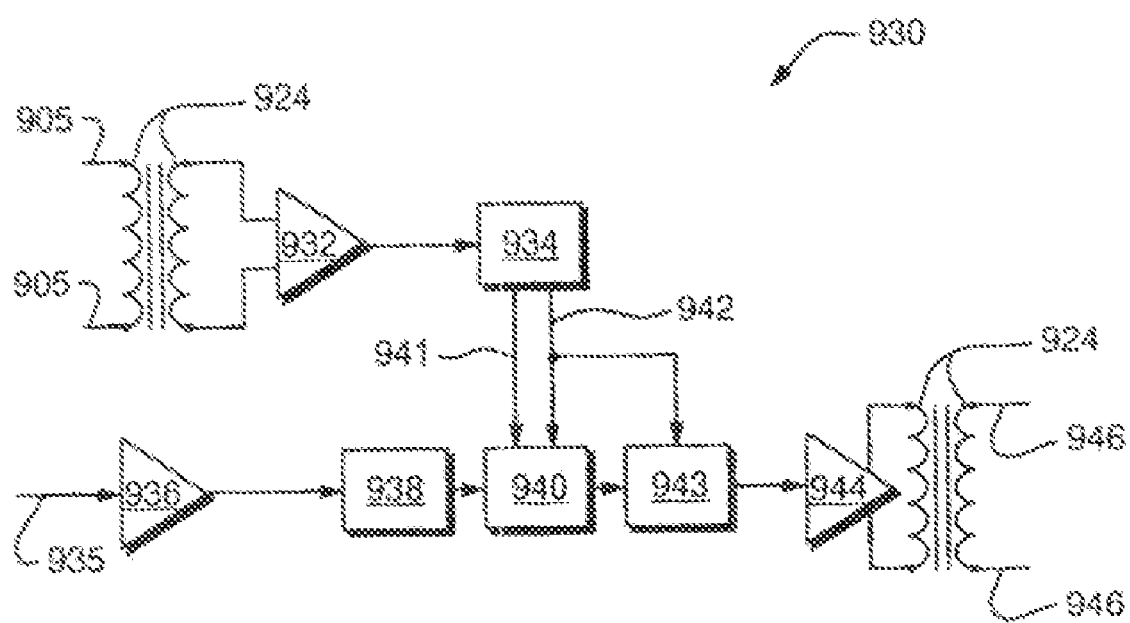
FIG. 11 is a block diagram showing an expanded view of the input module in FIG. 9, in accordance with the present invention.

FIG. 11 shows a detailed illustration of input module 920, of system 900, distributing and mixing audio data, in accordance with the present invention. It should be noted that a control bus independently addresses each of input modules 930 in system 900. The control bus, in accordance with the present invention, includes information for varying a gain, frequency, or effects associated with an input channel, output bus, or a mix.

Further, each input module 930 processes its own input signals. Some of the processes that input module 930 performs include, without limitation, and A/D conversion, equalization, effects, and time alignment delay. After processing, input module 930 adds the signals to the busses carried on data link 920.

As shown in FIG. 11, input data enters input module 930 via connector 924 at module receiver 932. It should be noted that input data is coming from either master module 905 or preceding input module 930. Data is then de-packetized by data de-packetizer 934 where data is split into mix bus audio data 941 and control data 942. It should be noted that local audio signals 935 enter input module 930 at input circuit 936 and are digitized.

Note that, in one embodiment, input circuit 936 comprises a digitally remote controlled microphone preamp. In accordance with the present invention, the digitally remote controlled microphone preamp can be controlled remotely from any one of control surfaces 915, 915', 915" such that control data is sent from any one of control surfaces 915, 915', 915" to adjust the microphone preamp's gain at input module 930.

In any event and in accordance with the present invention, the digitized local audio signals 935 are delayed by the necessary sample amount in sample buffer/delay generator 938. Note that the amount of delay is determined by the position of input module 930 in the input module loop (i.e., daisy-chain), as shown in FIG. 9. This is done to time align the mixed audio output with the sample level accuracy. That is, because mix busses are built in time, a specific delay is associated with each input module 930. In other words, each input module 930 has s defined delay that is used to maintain a final mix in a time aligned format.

For instance, in one embodiment of system 900 that comprises six input modules 930 where each input module 930 takes one audio sample period to process its input signals onto the mix busses, first input module 930' would mix onto the busses its current sample, the second input module 930 would mix onto the busses one sample previous to its current sample (from memory), the next input module would mix onto the busses tow samples previous to its current sample (from memory), and so on, until last input module 930" (i.e., sixth) would mix onto the busses five samples previous to its current sample (i.e., input module 930" would require memory to store five samples of audio data).

In any event and in accordance with the present invention, digital audio mixing block 940 mixes and provides EQ and effects to the digitized and delayed local audio signals 953 per control data instructions 942. That is, the output from digital audio mixing block 940 represents updated digital audio busses with local audio mixed in per the control data 942. The output of digital audio mixing block 940 is then packetized by data packetizer 943 and transmitted to next input module 930 by output driver 944. Output data 946 is then sent to subsequent (or following) input module 930 in the chain.

In accordance with the present invention, input module 930 must de-packetize input data coming into input module 930 and split into audio data 941 and control data 942, followed by digitally mixing audio data 941 and its local audio signals 935 into the mixer busses per control 942 that governs input module 930's inputs. Also, input module 930 must preserve all control data 942 and re-packetize the digital audio data (i.e., 935 and 941) and control data 942 for retransmission to the next input module 930 where the entire process, as described, repeats.

Referring again to FIG. 9, it should be noted that, in accordance with the present invention, any number of receivers 950 can be connected to master module 905 and provide independent mixes of the system audio busses. Using this configuration, an infinite amount of mixes can be provided. It should be noted that the configuration of FIG. 9 allows each input module 930 to receive mixing instructions addressed to that module 930 and then passes a signal mixed in with the instructions in next input module 930. In accordance with the present invention, this process can be done while no human perceptible delay is introduced into the mixed signal as it moves through link 920.

Figure 12:
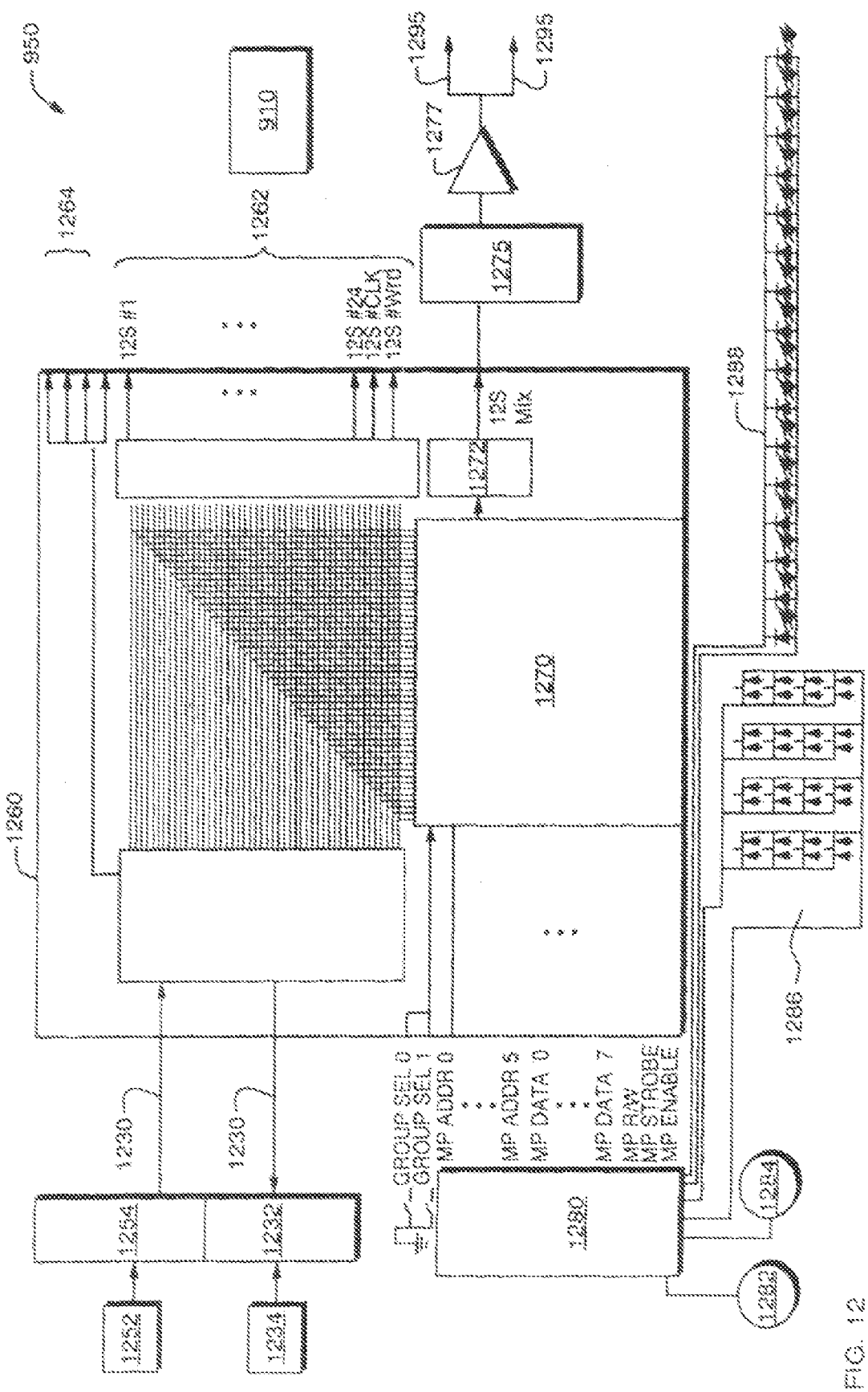
FIG. 12 is a block diagram showing an expanded view of the receiver in FIG. 9, in accordance with the present invention.

FIG. 12 shows a detailed view of receiver 950 of system 900 shown in FIG. 9, in accordance with the present invention. As shown, data enters receiver 950 through receiver connector 1252 and is passed to receiver PHY 1254. Receiver connector 1252 comprises an RJ-45 Category-5 approved connector. Receiver 950 receives the requisite system data via the input data from receiver connector 1252. It should be noted that the transmission (of data) is immediately repeated, with virtually no delay, to Ethernet PHY 1232 and to other receiver connector 1234 to provide daisy chained data to other receivers 950 by buffering it and re-clocking it in ASIC 1260 via Ethernet MII interface 1230.

After receiving the transmission, receiver ASIC 1260 de-packetizes (or reconstructs) the data. After de-packetizing the data, receiver ASIC 1260 sends separate audio I2S signals 1262 and data signals 1264 to other components such as D/A converters, digital signal processors, and/or microprocessors (not shown).

Additionally, receiver ASIC 1260 performs digital mixing of audio channels (forty-eight channels are shown in the embodiment) with mixer 1270. Digital audio mixer block 1270 mixes the audio channels into a stereo pair, converts the mixed signals to an I2S signal in converter 1272, and outputs through D/A 1275 and analog connections output circuit 1277. The output is transmitted via one or more output channels 1295. Note that mixer 1270 also adds EQ and effects and is controlled by the microprocessor 1280, which also controls indicators 1288 and reacts to rotary encoders 1282, potentiometers 1284, and switches 1286.

Figure 13:
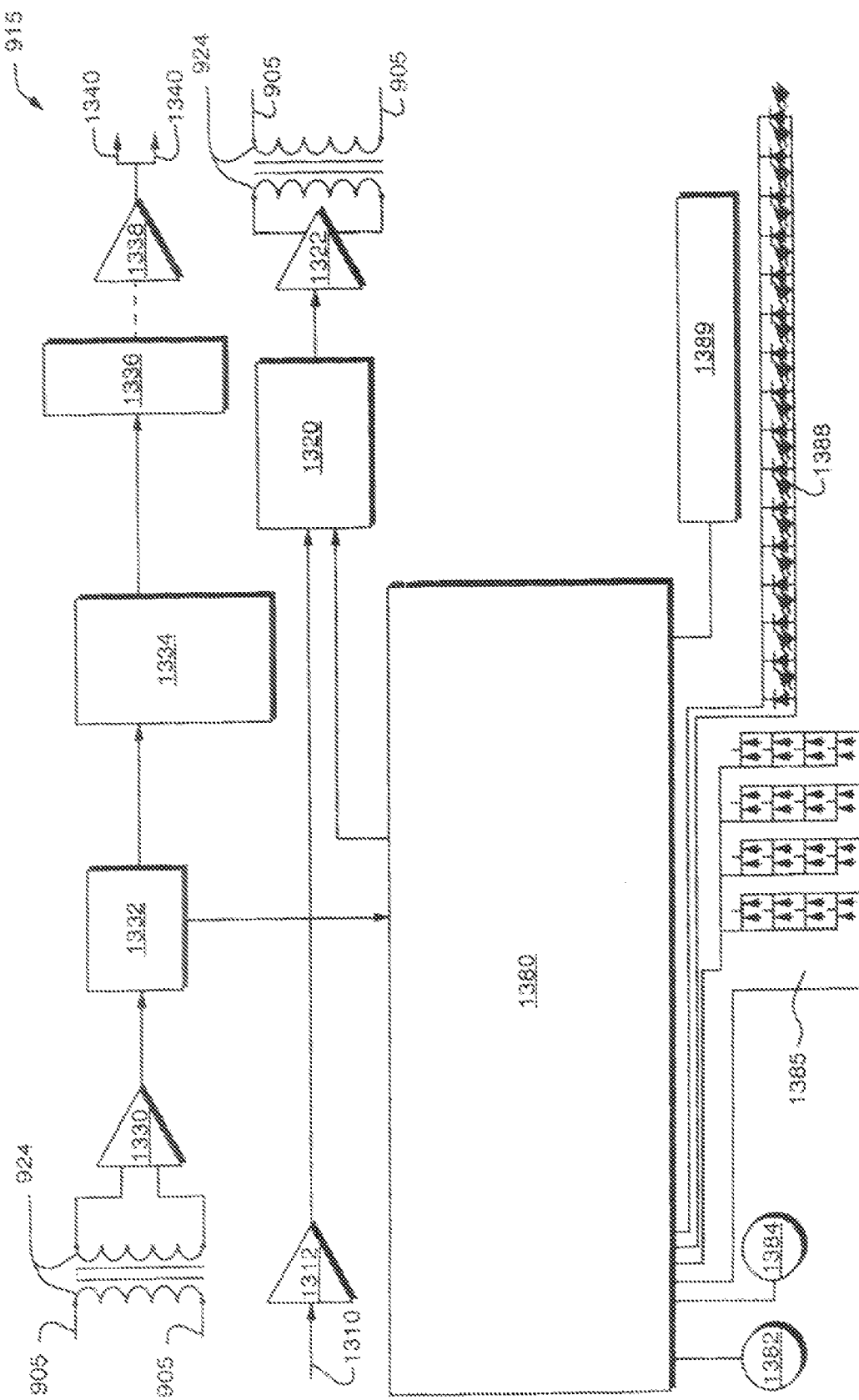
FIG. 13 is a block diagram showing an expanded view of the control surface in FIG. 9, in accordance with the present invention.

Referring again to FIG. 9, recall that data distribution and mixing system 900 includes a plurality of control surfaces 915, each of which can be used to control the functions of master module 905. FIG. 13 shows, in accordance with the present invention, a detailed representation of one embodiment of control surface 915.

Note that, in accordance with the present invention, microprocessor 1380 is coupled to multiple input and/or output devices. These devices are used to, among other things, communicate with users. For instance, a suer can enter input to microprocessor 1380 by using rotary encoders 1382, potentiometers 1484, and/or switches 1385. Microprocessor 1380 can provide to the user the system status information by using indicators 1388 and/or display 1389.

In accordance with the present invention, control data is output from microprocessor 1380 per the control settings. The control data is sent to data packetizer 1320, which merges and packetizes the control data with any local audio 1310 coming in form A/D 1312 and transmits the packetized data to master module 905 via output circuit 1322.

Note that data from master module 905 enters control surface 915 at input circuit 1330. Thereafter, data de-packetizer 1332 separates the control data and audio data and sends the control data to microprocessor 1380. This allows display 1389 to be synchronized with changes made by other control surfaces 915 (or other system components, such as input modules 930). Furthermore, data de-packetizer 1332 sends the audio data to audio channel selector 1334, which selects and sends digital audio to output circuit 1338 for local audio outputs 1340. D/A converter 1336, which can be used to convert signal, is placed between audio channel selector 1334 and output circuit 1338. Note that audio outputs 1340 can drive the local EQs and effects units.

It should be noted that, each audio channel can have many different parameters, such as EQ (frequency, boost/cut, or Q), gain, FX (reverb type, reverb time, reverb density, or delay). In accordance with the present invention, microprocessor 1380 keeps track of the parameters that control surface 915 can change. For instance, not that in a system having multiple control surfaces 915, not all control surfaces need to control all parameters. In such a situation, it may be desirable to control only a subset of the parameters on some or all of control surfaces 915. Thus, it may be desirable to make control surfaces 915 control exclusive parameters for controlling their own respective local space.

As noted, the configuration of system 900 represents one embodiment that is used to carry out the inventive concepts of the present invention, and, as such, there are multiple variations thereof within the scope and spirit of the present invention. For instance, one embodiment of system 900 uses the DTP comprising a protocol that will automatically enumerate each audio channel of input module 930 in a manner that assigns each audio channel of input module 930 to a given mixer channel regardless of the order in which input modules 930 are connected along the chain.

Isolated Grounding and Data Loopback Scheme

In accordance with the present invention, a data transmission and distribution system having multiple receivers is provided, whereby each receiver can repeat data signals that are in Ethernet format. Additionally, a system where each receiver includes an isolated power supply is provided.

Figure 14:
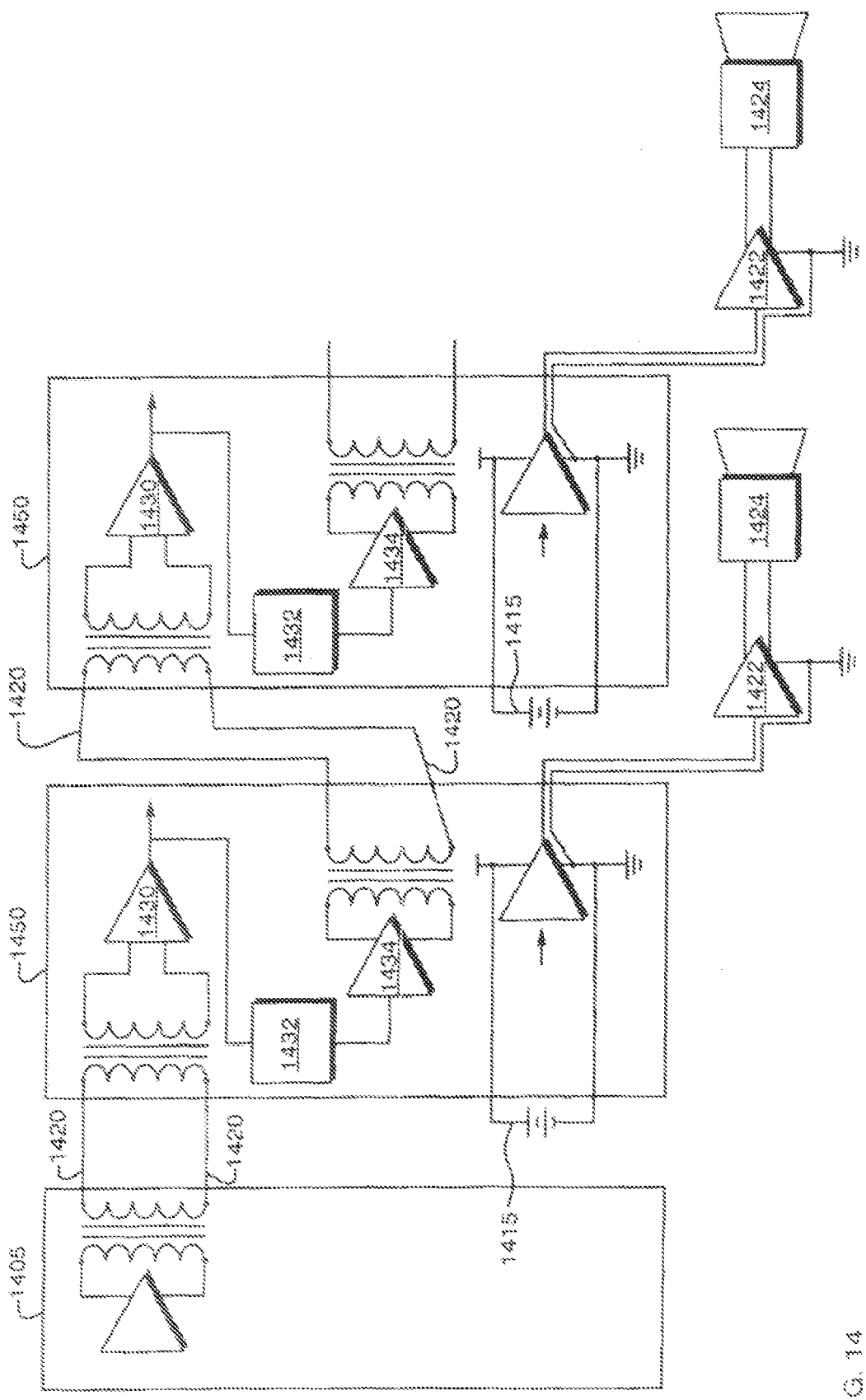
FIG. 14 is a diagram showing yet another embodiment of data mixing and distribution system, in accordance with the present invention.

In accordance with the present invention, FIG. 14 shows transmitter 1405 communicatively coupled to receivers 1450 via link 1420. Transmitter 1405 and receivers 1450 in FIG. 14 are shown in an exemplary embodiment to illustrate the inventive concepts of the present invention, and there are multiple variations thereof within the scope and spirit of the present invention.

For instance, in FIG. 14, either transmitter 1405 or receiver 1450 can be replaced with transmitter 105, transmitter 510, transmitter 605, master module 905, input module 930, control surface 915, receiver 950, receiver 550, receiver 650, or receiver 107. Also, it should be noted that while the embodiment shown in FIG. 14 relates to data signals in Ethernet format, other embodiments of transmitters 1405 and receiver 1450 can be used with any ground isolated data link.

In accordance with the present invention, transmitter 1405 and receivers 1450 can receive, transmit, and distribute data signals that are in Ethernet format, and such signals are repeated along receivers 1450 using a daisy-chained topology. This is accomplished by first keeping link 1420 isolated with a transformer, optical or RF isolation, and then by implementing a ground isolated floating power supply 1415. This combination allows the ground reference of receiver 1450 to float to the ground potential of external amp 1422 and speaker 1424.

It should be noted that providing isolated grounding is very useful since, in a typical audio and/or video distribution system, ground loops can cause audio hum or visual artifacts. By providing isolated grounding to receivers 1450 that are chained together in a daisy-chain, each receiver 1450 can eliminate audio hum and/or visual artifacts.

As noted, the present invention provides the system for each receiver in a chain to repeat data signals that are in Ethernet format. In accordance with the present invention, this is accomplished by wrapping the data (received from transmitter 1405 or receiver 1450) to an output driver 1434. More specifically, the output data from transmitter 1405 (or receiver 1450) is transmitted to input receiver 1430 and then to data loop buffer 1432. The data is then sent to output driver 1434.

Note that this configuration requires data loop buffer 1432 to account for the asynchronous nature of the recovered transmitter Ethernet clock and the receiver Ethernet clock. Also not that, using this configuration as shown in FIG. 14, a daisy-chained system can be implemented using the Ethernet topology. As know, Ethernet only follows either star topology or bus topology. This is very useful since, in the configuration of FIG. 14, each receiver 1450 can act as a repeater while following the Ethernet topology. AS a result, receivers 1450 can have a maximum distance of over several hundred feet between one another.

While much of the description herein regarding the systems and methods of the present invention pertains to audio data, the systems and methods, in accordance with the present invention, are equally applicable to any other types of data, such as video data and generic data, including control data.

Likewise, while much of the description herein regarding the systems and methods of the present invention pertains to a physical Ethernet serial data link, the systems and methods, in accordance with the present invention, are equally applicable to any other types of data links, including without limitation, optical, RF, and copper links.

It will be appreciated by those skilled in the art that changes could be made to the embodiments described above without departing from the broad inventive concept thereof It is understood, therefore, that this invention is not limited to the particular embodiments disclosed, but is intended to cover modifications within the spirit and scope of the present invention as defined in the appended claims.

What is claimed is:

1. An apparatus for assembling multi-channel audio data into a packet format, the apparatus comprising:
   one or more audio to digital (A/D) converters, wherein each A/D converter receives audio data from one or more audio channels and outputs digitized audio data for each audio channel;
   a packetizer in communication with each A/D converter, wherein the packetizer assembles at least the digitized audio data for the one or more audio channels into one or more packets, wherein each packet includes a plurality of copies of high priority bits of digitized audio data and only one set of low priority bits of digitized audio data; and
   a transmitter interface in communication with the packetizer, wherein the transmitter transmits the one or more packets over a communication link.

2. The apparatus of claim 1 wherein the communication link comprises a CAT-5 cable.

3. The apparatus of claim 1 wherein the one or more packets comprise an Ethernet packet.

4. The apparatus of claim 1 wherein each packet further comprises control data.

5. An apparatus for outputting audio data, the apparatus comprising:
   a receiver interface for receiving one or more packets from a first communication link;
   a de-packetizer in communication with the receiver interface, wherein the de-packetizer disassembles the one or more packets into data corresponding to one or more audio channels;
   a mixer in communication with the de-packetizer, wherein the mixer performs digital mixing of the one or more audio channels; and
   a digital to audio (D/A) converter in communication with the mixer, wherein the D/A converter produces audio data for one or more output channels.

6. The apparatus of claim 5 wherein the first communication link comprises a CAT-5 cable.

7. The apparatus of claim 5 wherein the one or more packets comprise an Ethernet packet.

8. The apparatus of claim 5 wherein each packet comprises control data, wherein the mixer performs digital mixing of the one or more audio channels using at least the control data.

9. The apparatus of claim 5, further comprising:
   a transmitter interface in communication with the receiver interface, wherein the transmitter interface forwards each packet received over the receiver interface over a second communication link.

10. The apparatus of claim 9 wherein the second communication link comprises a CAT-5 cable.

11. The apparatus of claim 5, further comprising:
   a gain controller in communication with the D/A converter, wherein the gain controller provides gain to the audio data for at least one output channel.

12. A system for distributing and mixing audio data, the system comprising:
   a transmitters comprising:
      one or more audio to digital (A/D) converters, wherein each A/D converter receives audio data from one or more audio channels and outputs digitized audio data for each audio channel,
      a packetizer in communication with each A/D converter, wherein the packetizer assembles at least the digitized audio data for the one or more audio channels into one or more packets, wherein each packet includes a plurality of copies of high priority bits of digitized audio data and only one set of low priority bits of digitized audio data, and
      a first transmitter interface in communication with the packetizer, wherein the first transmitter interface transmits the one or more packets over a first communication link; and
   a first receiver, comprising:
      a receiver interface, wherein the receiver interface receives the one or more packets from the first communication link,
      a de-packetizer in communication with the receiver interface, wherein the de-packetizer disassembles the one or more packets into data corresponding to the one or more audio channels,
      a mixer in communication with the de-packetizer, wherein the mixer performs digital mixing of the one or more audio channels, and
      a digital to audio (D/A) converter in communication with the mixer, wherein the D/A converter produces audio data for one or more output channels.

13. The system of claim 12 wherein each packet further comprises control data, wherein the mixer performs digital mixing of the one or more audio channels using at least the control data.

14. The system of claim 12 wherein the first receiver further comprises a transmitter interface in communication with the receiver interface, wherein the transmitter interface forwards each packet received over the receiver interface over a second communication link, and wherein the system further comprises:
   a second receiver, comprising:
      a receiver interface, wherein the receiver interface receives the one or more packets from the second communication link,
      a de-packetizer in communication with the receiver interface, wherein the de-packetizer disassembles the one or more packets into data corresponding to the one or more audio channels,
      a mixer in communication with the de-packetizer, wherein the mixer performs digital mixing of the one or more audio channels, and
      a digital to audio (D/A) converter in communication with the mixer, wherein the D/A converter produces audio data for one or more output channels.

15. The system of claim 12, wherein the transmitter further comprises:
   a second transmitter interface in communication with the packetizer, wherein the second transmitter interface transmits the one or more packets over a third communication link; and
   wherein the system further comprises a second receiver, wherein the second receiver comprises:
      a receiver interface, wherein the receiver interface receives the one or more packets from the third communication link, a de-packetizer in communication with the receiver interface, wherein the de-packetizer disassembles the one or more packets into data corresponding to the one or more audio channels, a mixer in communication with the de-packetizer, wherein the mixer performs digital mixing of the one or more audio channels, and a digital to audio (D/A) converter in communication with the mixer, wherein the D/A converter produces audio data for one or more output channels.

16. A method of mixing and distributing data, the method comprising:

receiving audio data on one or more audio channels;

generating digitized audio data for each channel of the audio data;

assembling the digitized audio data into one or more packets, wherein each packet includes a plurality of copies of high priority bits of digitized audio data and only one set of low priority bits of digitized audio data; and transmitting the one or more packets over a communication link.

17. The method of claim 16, further comprising:

receiving the one or more packets from the communication link;

disassembling the one or more packets into digitized audio data for the one or more audio channels;

digitally mixing the one or more audio channels; and producing audio data for one or more output channels.

18. The method of claim 16, wherein each packet further comprises control data, wherein digitally mixing the one or more audio channels comprises digitally mixing the one or more audio channels using at least the control data.

* * * * *